US012744569B2

(12) United States Patent
Alkhateeb et al.

(10) Patent No.: US 12,744,569 B2
(45) Date of Patent: Sep. 22, 2026

(54) REINFORCEMENT LEARNING OF BEAM CODEBOOKS FOR MILLIMETER WAVE AND TERAHERTZ MIMO SYSTEMS

(71) Applicant: ARIZONA BOARD OF REGENTS ON BEHALF OF ARIZONA STATE UNIVERSITY, Scottsdale, AZ (US)

(72) Inventors: Ahmed Alkhateeb, Chandler, AZ (US); Yu Zhang, Tempe, AZ (US); Muhammad Alrabeiah, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 322 days.

(21) Appl. No.: 18/578,896

(22) PCT Filed: Jul. 12, 2022

(86) PCT No.: PCT/US2022/036795

§ 371 (c)(1),
(2) Date: Jan. 12, 2024

(87) PCT Pub. No.: WO2023/287769

PCT Pub. Date: Jan. 19, 2023

(65) Prior Publication Data

US 2025/0007579 A1 Jan. 2, 2025

Related U.S. Application Data

(60) Provisional application No. 63/221,192, filed on Jul. 13, 2021.

(51) Int. Cl.
*H04B 7/06* (2006.01)

(52) U.S. Cl.
CPC ......... *H04B 7/0617* (2013.01); *H04B 7/0684* (2013.01)

(58) Field of Classification Search
CPC ............................ H04B 7/0617; H04B 7/0684
(Continued)

(56) References Cited

U.S. PATENT DOCUMENTS

2009/0238156 A1 9/2009 Yong et al.
2019/0140730 A1 5/2019 Oteri et al.
(Continued)

OTHER PUBLICATIONS

International Search Report and Written Opinion mailed Oct. 4, 2022 in corresponding International Application No. PCT/US2022/036795, 13 pages.
(Continued)

*Primary Examiner* — Fitwi Y Hailegiorgis
(74) *Attorney, Agent, or Firm* — MH2 Technology Law Group LLP

(57) ABSTRACT

Reinforcement learning of beam codebooks for millimeter wave and terahertz multiple-input-multiple-output (MIMO) systems is provided. Millimeter wave (mmWave) and terahertz (THz) MIMO systems rely on predefined beamforming codebooks for both initial access and data transmission. These predefined codebooks, however, are commonly not optimized for specific environments, user distributions, and/or possible hardware impairments. To overcome these limitations, this disclosure develops a deep reinforcement learning framework that learns how to optimize the codebook beam patterns relying only on receive power measurements. The developed model learns how to adapt the beam patterns based on the surrounding environment, user distribution, hardware impairments, and array geometry. Further, this approach does not require any knowledge about the channel, radio frequency (RF) hardware, or user positions.

20 Claims, 14 Drawing Sheets

(58) Field of Classification Search
USPC .......................................................... 375/299
See application file for complete search history.

(56) References Cited

U.S. PATENT DOCUMENTS

| | | | |
|---|---|---|---|
| 2020/0358514 A1 | 11/2020 | Landis et al. | |
| 2021/0194551 A1 | 6/2021 | Raghavan et al. | |
| 2021/0250068 A1* | 8/2021 | Lee ...................... | G06N 3/0495 |
| 2023/0006718 A1* | 1/2023 | Kostas ................. | H04B 7/0695 |

OTHER PUBLICATIONS

Zhang et al., "Reinforcement Learning for Beam Pattern Design in Millimeter Wave and Massive MIMO Systems," 2020 (2020), [Retrieved from online on Sep. 6, 2022 (Sep. 6, 2022)]; [Retrieved from URL: https://ieeexplore.ieee.org/abstract/document/9443430]; entire document.

* cited by examiner

Selected User Grid
C2
C3
C4
C1
User Grid 1
100
R1400
R1101
Base Station3
Building

REINFORCEMENT LEARNING OF BEAM CODEBOOKS FOR MILLIMETER WAVE AND TERAHERTZ MIMO SYSTEMS

RELATED APPLICATIONS

This application is a national stage entry under 35 U.S.C. § 371 of PCT Application No. PCT/US2022/036795 entitled "REINFORCEMENT LEARNING OF BEAM CODEBOOKS FOR MILLIMETER WAVE AND TERAHERTZ MIMO SYSTEMS" filed Jul. 12, 2022, which claims the benefit of provisional patent application Ser. No. 63/221,192, filed Jul. 13, 2021, the disclosures of which are hereby incorporated herein by reference in their entireties.

GOVERNMENT SUPPORT

This invention was made with government support under 1923676 awarded by the National Science Foundation. The government has certain rights in the invention.

FIELD OF THE DISCLOSURE

The present disclosure is related to adaptive beamforming in multi-antenna wireless communications systems.

BACKGROUND

Millimeter wave (mmWave) and terahertz (THz) multiple-input-multiple-output (MIMO) systems adopt large antenna arrays to compensate for significant path loss and ensure sufficient receive signal power. Because of the high cost and power consumption of mixed-circuit components, however, these systems normally rely either fully or partially on analog beamforming, where transceivers employ networks of phase shifters. This makes the basic MIMO signal processing functions, such as channel estimation and beamforming design, challenging as the channels are seen only through the radio frequency (RF) lens. This motivates mmWave/THz massive MIMO systems to rely on predefined beamforming codebooks for both initial access and data transmission.

The classical predefined beamforming/beamsteering codebooks normally consist of a large number of single-lobe beams, each of which can steer the signal towards one direction. These classical codebooks, though, have several drawbacks: (i) To cover all the possible directions, these codebooks consist of a large number of beams, which makes the search over them associated with high beam training overhead. (ii) The second issue is a blowback from the directivity blessing; classical beamsteering codebooks employ single-lobe beams to maximize directivity, which, in many cases, may not be optimal, especially for non-line-of-sight (NLOS) users. (iii) Further, the design of the classical codebooks normally assumes that the array is calibrated and its geometry is known, which associates this design processing with high cost (due to the need for expensive calibration) and makes it hard to adapt to systems with unknown or arbitrary array geometries.

SUMMARY

Reinforcement learning of beam codebooks for millimeter wave and terahertz multiple-input-multiple-output (MIMO) systems is provided. Millimeter wave (mmWave) and terahertz (THz) MIMO systems rely on predefined beamforming codebooks for both initial access and data transmission. These predefined codebooks, however, are commonly not optimized for specific environments, user distributions, and/or possible hardware impairments. This leads to large codebook sizes with high beam training overhead, which makes it hard for these systems to support highly mobile applications.

To overcome these limitations, this disclosure develops a deep reinforcement learning framework that learns how to optimize the codebook beam patterns relying only on receive power measurements. The developed model learns how to adapt the beam patterns based on the surrounding environment, user distribution, hardware impairments, and array geometry. Further, this approach does not require any knowledge about the channel, radio frequency (RF) hardware, or user positions. To reduce the learning time, some embodiments of the proposed model design a novel Wolpertinger-variant architecture that is capable of efficiently searching the large discrete action space. This complex-valued neural network design respects the RF hardware constraints such as the constant-modulus and quantized phase shifter constraints. Simulation results confirm the ability of the developed framework to learn near-optimal beam patterns for both line-of-sight (LOS) and non-LOS (NLOS) scenarios and for arrays with hardware impairments without requiring any channel knowledge.

An exemplary embodiment provides a method for intelligently learning a beam codebook for multi-antenna wireless communications, the method comprising: obtaining receive power measurements from a plurality of antennas; and training the beam codebook using deep learning and the receive power measurements.

Another exemplary embodiment provides a neural network for learning a beam codebook for multi-antenna wireless communications, the neural network comprising: an actor network configured to predict one or more beam patterns for the beam codebook; and a critic network configured to evaluate the one or more beam patterns predicted by the actor network based on receive power measurements of an environment.

Another exemplary embodiment provides a wireless communication node, comprising: communication circuitry coupled to a plurality of antennas and configured to establish communications with a wireless device in an environment; and a processing system configured to: obtain receive power measurements from the plurality of antennas; perform a machine learning-based analysis of the environment based on the receive power measurements; and adapt communications with the wireless device in accordance with the machine learning-based analysis of the environment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
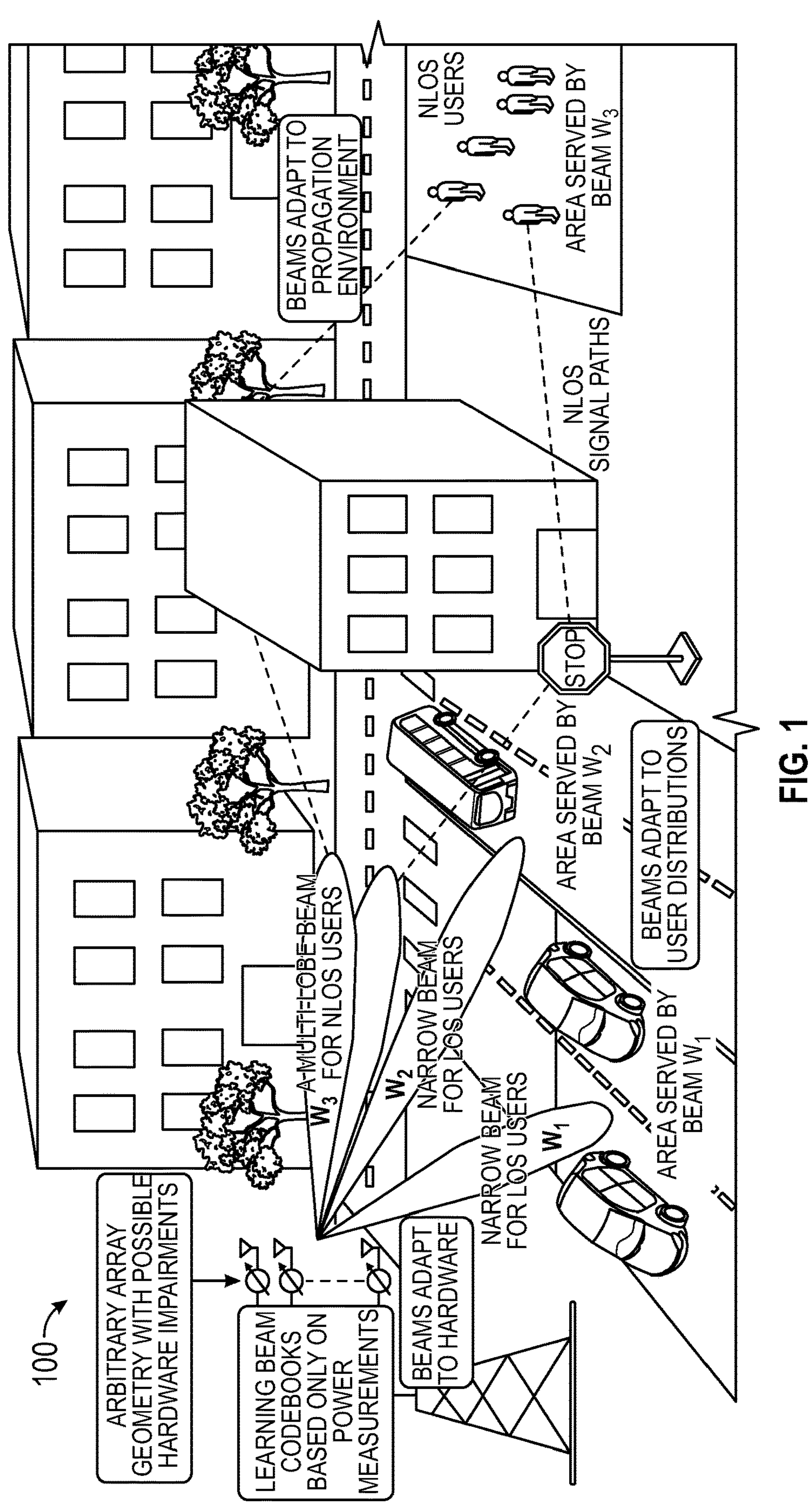
FIG. 1 is a schematic diagram of a millimeter wave (mmWave)/massive multiple-input-multiple-output (MIMO) base station with an arbitrary antenna array serving users with a beam codebook W according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Reinforcement learning of beam codebooks for millimeter wave and terahertz multiple-input-multiple-output (MIMO) systems is provided. Millimeter wave (mmWave) and terahertz (THz) MIMO systems rely on predefined beamforming codebooks for both initial access and data transmission. These predefined codebooks, however, are commonly not optimized for specific environments, user distributions, and/or possible hardware impairments. This leads to large codebook sizes with high beam training overhead which makes it hard for these systems to support highly mobile applications.

To overcome these limitations, this disclosure develops a deep reinforcement learning (DRL) framework that learns how to optimize the codebook beam patterns relying only on receive power measurements. The developed model learns how to adapt the beam patterns based on the surrounding environment, user distribution, hardware impairments, and array geometry. Further, this approach does not require any knowledge about the channel, radio frequency (RF) hardware, or user positions. To reduce the learning time, some embodiments of the proposed model design a novel Wolpertinger-variant architecture that is capable of efficiently searching the large discrete action space. This complex-valued neural network design respects the RF hardware constraints such as the constant-modulus and quantized phase shifter constraints. Simulation results confirm the ability of the developed framework to learn near-optimal beam patterns for both line-of-sight (LOS) and non-LOS (NLOS) scenarios and for arrays with hardware impairments without requiring any channel knowledge.

I. Introduction

The drawbacks of classical predefined beamforming/beamsteering codebooks stem from the lack of environment and hardware adaptability. A mmWave/THz system that has a sense of its environment could discover the most frequent signal directions (for both single and multi-path cases) and accordingly tailor its codebook beam patterns (directions, shapes, number of lobes, etc.). Furthermore, the system can also overcome the challenges with intrinsic hardware impairments or unknown/arbitrary array geometries by learning how to calibrate its beams to adapt to the given hardware.

All that awareness and adaptability can potentially be achieved if the mmWave/THz system incorporates a data-driven and artificially-intelligent component. Towards this goal, leveraging machine learning tools, especially reinforcement learning, is particularly promising. Reinforcement learning models can efficiently learn from the observed data and responses obtained from both the hardware and environment, which may potentially reduce the channel knowledge requirements. Hence, this disclosure develops a reinforcement learning-based approach that learns how to adapt the codebook beams to the environment and hardware without requiring explicit channel knowledge.

Developing environment and hardware awareness using machine learning is not straightforward when the mmWave system constraints are considered, e.g., channels are not available, phase shifters have finite and limited resolution, and hardware envelops unknown impairments. This disclosure develops a DRL-based framework that can efficiently learn mmWave beam codebooks while addressing all these challenges. The main contributions of this disclosure can be summarized as follows:

- Designing a DRL-based framework that can learn how to optimize the beam pattern for a set of users with similar channels. The developed framework relies only on receive power measurements and does not require any channel knowledge. This framework adapts the beam pattern based on the surrounding environment and learns how to compensate for the hardware impairments. This is done by utilizing a novel Wolpertinger architecture which is designed to efficiently explore the large discrete action space. Further, the proposed model accounts for key hardware constraints such as the phase-only, constant-modulus, and quantized-angle constraints.
- Developing a reinforcement learning framework that is capable of learning a codebook of beam patterns optimized to serve the users in the surrounding environment. The proposed framework autonomously optimizes the codebook beam patterns based on the environment, user distribution, hardware impairments, and array geometry. Further, it relies only on the receive power measurements, does not require any position or channel knowledge (which relaxes the synchronization/coherence requirements), and does not require the users to be stationary during the learning process. This is achieved by developing a novel pre-processing approach that relies on signal-to-noise ratio (SNR)-based feature matrices to partition/assign the users into clusters based on which parallel neural networks are trained.
- Extensively evaluating the performance of the proposed codebook learning approaches based on the publicly available DeepMIMO dataset. These experiments adopt both outdoor and indoor wireless communication scenarios and learn codebooks with different sizes. Further, this evaluation is done both for perfect uniform arrays and for arrays with arbitrary geometries and hardware impairments. These experiments provide a comprehensive evaluation of the proposed reinforcement learning-based codebook learning approach.

The simulation results show that the proposed approach is capable of learning optimized beam patterns and beam codebooks without the need for providing any channel state information. Instead, based solely on the receive combining gains, the DRL solution adjusts the phases of the beamforming vectors to increase the receive gain and finally yield significant improvements over the classical beamsteering codebooks.

II. System and Channel Models

This section introduces in detail the adopted system and channel models. This section also describes how the model considers arbitrary arrays with possible hardware impairments.

A. System Model

FIG. 1 is a schematic diagram of a network node 100 in the form of a mmWave/massive MIMO base station with an arbitrary antenna array serving users with a beam codebook $\mathcal{W}$ according to embodiments described herein. The objective is to develop a learning approach for adapting the codebook $\mathcal{W}$ to match the given hardware and environment based only on SNR measurements (which relaxes the coherence/synchronization requirements).

The system model shown in FIG. 1 is considered, where a mmWave massive MIMO base station with M antennas is communicating with a single-antenna user. Further, given the high cost and power consumption of mixed-signal components, a practical system is considered where the base station has only one RF chain and employs analog-only beamforming using a network of r-bit quantized phase shifters. To facilitate the system operation and to respect the hardware constraints, mmWave and massive MIMO systems typically use beamforming codebooks in serving their users.

Let $\mathcal{W}$ denote the beam codebook adopted by the base station and assume that it contains N beamforming/combining vectors, with each one of them taking the form $$w = \frac{1}{\sqrt{M}}\left[e^{j\theta_1}, e^{j\theta_2}, \ldots , e^{j\theta_M}\right]^T \quad \text{Equation 1}$$

where each phase shift $\theta_m$ is selected from a finite set $\Theta$ with $2^r$ possible discrete values drawn uniformly from $(-\pi, \pi]$.

In the uplink transmission, if a user u transmits a symbol $x \in \mathbb{C}$ to the base station, where the transmitted symbol satisfies the average power constraint $\mathbb{E}[|x|^2]=P_x$, the received signal at the base station after combining can be expressed as $$y_u = w^H h_u x + w^H n \qquad \text{Equation 2}$$

where $h_u \in \mathbb{C}^{M \times 1}$ is the uplink channel vector between the user u and the base station antennas and $n \sim \mathcal{N}_{\mathbb{C}}$ $$\mathcal{N}_{\mathbb{C}}(0, \sigma_n^2 I)$$

is the receive noise vector at the base station.

B. Channel Model

A general geometric channel model is adopted for $h_u$. Assume that the signal propagation between the user u and the base station consists of L paths. Each path $\ell$ has a complex gain $\alpha_l$ and an angle of arrival $\phi_\ell$. Then, the channel vector can be written as $$h_u = \sum_{\ell=1}^{L} \alpha_\ell a(\phi_\ell) \qquad \text{Equation 3}$$

where $a(\phi_\ell)$ is the array response vector of the base station. The definition of $a(\phi_\ell)$ depends on the array geometry and hardware impairments. This is discussed in more detail next.

C. Hardware Impairments Model

Most of the prior work on mmWave signal processing has assumed uniform antenna arrays with perfect calibration and ideal hardware. This disclosure considers a more general antenna array model that accounts for arbitrary geometry and hardware imperfections, and targets learning efficient beam codebooks for these systems. This is very important for several reasons: (i) there are scenarios where designing arbitrary arrays is needed, for example, to improve the angular resolution or enhance the direction-of-arrival estimation performance, (ii) the fabrication process of large mmWave arrays normally has some imperfections, and (iii) the calibration process of the mmWave phased arrays is an expensive process that requires special high-performance RF circuits.

While the codebook learning solutions that are developed herein are general for various kinds of arrays and hardware impairments, they are evaluated in Section VII with respect to two main characteristics of interest, namely non-uniform spacing and phase mismatch between the antenna elements. For linear arrays, the array response vector can be modeled to capture these characteristics as follows $$a(\phi_\ell) = \left[e^{j(kd_1 \cos(\phi_\ell)+\Delta\theta_1)}, e^{j(kd_2 \cos(\phi_\ell)+\Delta\theta_2)}, \ldots, e^{j(kd_M \cos(\phi_\ell)+\Delta\theta_M)}\right]^T \qquad \text{Equation 4}$$

where $d_m$ is the position of the m-th antenna, and $\Delta\theta_m$ is the additional phase shift incurred at the m-th antenna (to model the phase mismatch).

Without loss of generality, it is assumed that $d_m$ and $\Delta\theta_m$ are fixed yet unknown random realizations, obtained from the distributions $$\mathcal{N}((m-1)d, \sigma_d^2)\ \mathcal{N}(0, \sigma_p^2),$$

respectively, where σd and σp model the standard deviations of the random antenna spacing and phase mismatch. Besides, an additional constraint $d_1 < d_2 < \ldots < d_M$ is imposed to make the generated antenna positions physically meaningful.

III. Problem Definition

This disclosure investigates the design of mmWave beamforming codebooks that are adaptive to the specific deployment (surrounding environment, user distribution, etc.) and the given network node (e.g., base station) hardware (array geometry, hardware imperfections, etc.). Given the system and channel models described in Section II, the SNR after combining for user u can be written as $$SNR_u = \frac{|w^H h_u|^2}{|w|^2} \rho \quad \text{with } \rho = \frac{P_x}{\sigma_n^2}. \qquad \text{Equation 5}$$

Besides, the beamforming/combining gain of adopting w is defined as a transmit/receive beamformer for user u as $$g_u = |w^H h_u|^2 \qquad \text{Equation 6}$$

If the combining vector w is selected from a codebook $\mathcal{W}$, with cardinality $|\mathcal{W}|=N$, then the maximum achievable SNR for user u is obtained by the exhaustive search over the beam codebook as $$SNR_u^* = \rho \max_{w \in \mathcal{W}} |w^H h_u|^2 \qquad \text{Equation 7}$$

where $\|w\|^2=1$ as these combining weights are implemented using only phase shifters with constant magnitudes of $1/\sqrt{M}$, as described in Equation 1.

The objective of this disclosure is to design (learn) the beam codebook $\mathcal{W}$ to maximize the SNR given by Equation 7 averaged over the set of the users that can be served by the base station. Let $\mathcal{H}$ represent the set of channel vectors for all the users that can be served by the considered base station, the beam codebook design problem can be formulated as $$\mathcal{W}_{opt} = \arg\max_{\mathcal{W}} \frac{1}{|\mathcal{H}|} \sum_{h_u \in \mathcal{H}} \left( \max_{w_n \in \mathcal{W}} |w_n^H h_u|^2 \right) \qquad \text{Equation 8}$$

$$\text{s.t. } w_{mn} = \frac{1}{\sqrt{M}} e^{j\theta_{mn}}, \forall m = 1, \ldots, M, n = 1, \ldots, N \qquad \text{Equation 9}$$

$$\theta_{mn} \in \Theta, \forall m = 1, \ldots, M, n = 1, \ldots, N \qquad \text{Equation 10}$$

where $w_{mn}=[w_n]_m$ is the m-th element of the n-th beamforming vector in the codebook, $|\mathcal{H}|=K$ is the total number of users, $\Theta$ is the set that contains the $2^r$ possible phase shifts. It is worth mentioning that the constraint in Equation 9 is imposed to uphold the adopted model where the analog beamformer can only perform phase shifts to the received signal, and the constraint in Equation 10 is to respect the quantized phase-shifters hardware constraint.

Due to the unknown array geometry as well as possible hardware impairments, the accurate channel state information is generally hard to acquire. This means that all the channels $h_u \in \mathcal{H}$ in the objective function are possibly unknown. Instead, the base station may only have access to the beamforming/combining gain $g_u$ (or equivalently, the received signal strength indicator (RSSI) reported by each user if a downlink setup is considered). Therefore, the problem in Equation 8 is hard to solve in a general sense for the unknown parameters in the objective function as well as the non-convex constraint of Equation 9 and the discrete constraint of Equation 10.

Given that this problem is essentially a search problem in a dauntingly huge yet finite and discrete space, embodiments described herein consider leveraging the powerful exploration capability of DRL to efficiently search over the space to find the optimal or near-optimal solution. Since the number of beams in the codebook is far less than the number of channels in $\mathcal{H}$, users sharing similar channels are expected to be served by the same beam that achieves the best average beamforming gain compared to the other beams in the codebook.

Based on this idea, it is proposed to solve the original problem of Equation 8 in two steps. First, Section IV investigates the problem of learning an optimized beam pattern for a single user or a group of users that share similar channels, which is referred to as the beam pattern learning problem and can be formulated as $$w_{opt} = \arg\max_{w} \frac{1}{|\mathcal{H}_s|} \sum\nolimits_{h_u \in \mathcal{H}_s} |w^H h_u|^2 \qquad \text{Equation 11}$$

$$\text{s.t. } w_m = \frac{1}{\sqrt{M}} e^{j\theta_m},\ \theta_m \in \Theta,\ \forall\, m = 1, \ldots, M \qquad \text{Equation 12}$$

where $w_m$ is the m-th element of the beamforming vector and $\mathcal{H}_s$ is the channel set that is supposed to contain a single channel or multiple similar channels. Then, Section V addresses the codebook design problem Equation 8 by introducing a joint clustering, assignment, and beam pattern learning approach.

IV. Beam Pattern Learning

This section presents the proposed DRL-based algorithm for addressing the beam pattern design problem in Equation 11, which aims to maximize the (averaged) beamforming gain of a single user (or a group of users that share the similar channels). Given the constraint in Equation 12, the design problem is essentially a search problem over a finite yet dauntingly huge discrete feasible set. For example, for a base station equipped with 32 antennas and 3-bit phase shifters, there are over $7.9\times10^{28}$ legitimate beamforming vectors. With this huge space, finding the optimal beamforming vector by using methods like exhaustive search is definitely infeasible.

Figure 2:
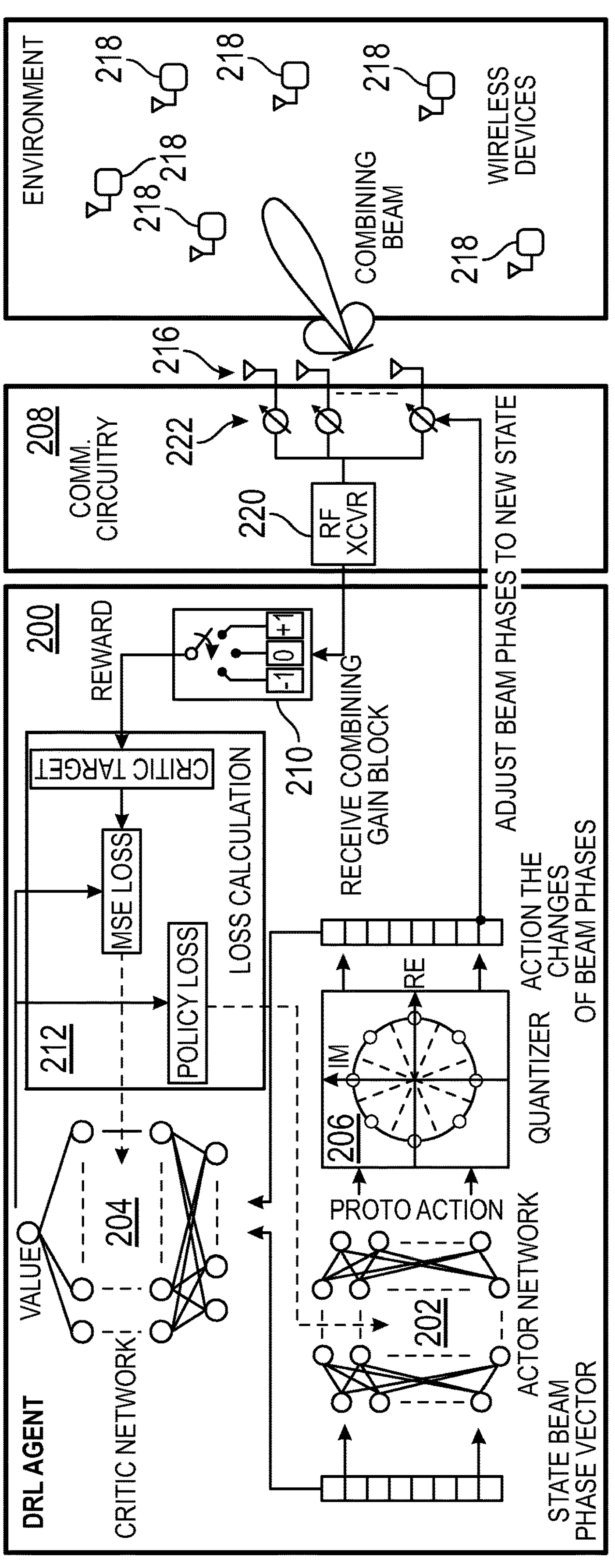
FIG. 2 is a block schematic diagram of a proposed beam pattern design framework with deep reinforcement learning (DRL).

FIG. 2 is a block schematic diagram of a proposed beam pattern design framework that is a neural network 200 of the DRL agent type. The schematic shows the proposed learning agent architecture, and the way it interacts with the environment. The neural network 200 includes an actor network 202 and a critic network 204. A state beam vector feeds the actor network 202 and the critic network 204. A quantizer 206 receives a proto action from the actor network 202, which in turn generates an action that feeds the critic network 204 and drives communication circuitry 208. A receive combining gain block 210 generates a reward that feeds a critic target that is used to calculate a mean squared error (MSE) that is employed by the critic network 204. A policy loss derived from the critic network 204 is employed by the actor network 202. The critic target and the policy loss are calculated by a loss calculation block 212.

The communication circuitry 208 is coupled to a plurality of antennas 216 and configured to establish communications with wireless devices 218 in an environment. Generally, the neural network 200 is configured to obtain receive power measurements from the plurality of antennas 216 and perform a machine learning-based analysis of the environment based on the receive power measurements. Communications with the wireless devices 218 is then adapted by the communications circuitry 208 to control a radio frequency (RF) transceiver (XCVR) 220 and phase shifters 222 in accordance with the machine learning-based analysis of the environment. The phase shifters 222 are coupled between the RF XCVR 220 and the plurality of antennas 216.

In order to achieve an efficient search process, embodiments of the neural network 200 use deep reinforcement learning where the network node 100 is able to learn from what it has experienced; that is, receive power from users and then proceed towards a better direction for a beamforming/combining vector. However, when viewing the problem from a reinforcement learning perspective, it features finite yet very high dimensional action space. This makes the traditional learning frameworks such as deep Q-learning, deep deterministic policy gradient, etc., hard to apply. To deal with the finite yet very high dimensional action space, a learning framework based on Wolpertinger architecture is proposed to narrow the size of the action space and avoid missing the optimal policy at the same time.

A. Wolpertinger Architecture Overview

Deep Q-networks are difficult to apply when the number of actions in the action space (referred to as the dimension of the action space) is huge. This is because the dimension of the output of the deep Q-network relates directly to the number of possible actions, which means that the size of the neural network will keep growing as the number of actions increases. However, for problems approaching real life complexity, it is highly likely to encounter applications that involve a huge action space, different from that in video games where only several actions are considered.

For example, in the problem described herein, the possible actions in the case given above (where the base station has 32 antennas and adopts 3-bit phase shifters) are in the order of $10^{28}$. The number can increase further with more antennas and higher resolution phase shifters. This is definitely intractable for the deep Q-network framework. With this motivation, the Wolpertinger architecture is proposed as a way of reasoning in a space with a large number of discrete actions. The Wolpertinger architecture is based on the actor-critic framework and is trained using deep deterministic policy gradient (DDPG). This novel architecture utilizes a K-nearest neighbor (KNN) classifier to make DDPG suitable for tasks with discrete, finite yet very high dimensional action space. The basic components of the Wolpertinger architecture are briefly introduced as follows.

1. Actor Network

An actor network 202 is depicted in FIG. 2. In this regard, assume an action space $\mathcal{A} \subseteq \mathbb{R}^n$ that is discrete and finite (but possibly with a large number of actions), from which the agent selects an action to execute. Further assume a state space $\mathcal{S} \subseteq \mathbb{R}^m$ that contains all the possible states of an environment. The action and state spaces will be defined in the context of the beam pattern learning problem in Section IV.B.

The actor network 202 is then constructed as a function approximator parameterized by $\theta^{\mu}$ mapping from the state space to the $\mathbb{R}^n$, that is $$\mu(\cdot \mid \theta^{\mu}): \mathcal{S} \to \mathbb{R}^n \quad \text{Equation 13}$$

Due to the discrete and finite nature of $\mathcal{A}$, the action predicted by the actor network 202 is probably not within $\mathcal{A}$. In other words, for any state $s \in \mathcal{S}$, a predicted proto-action can be obtained $$\mu(s \mid \theta^{\mu}) = \hat{a} \quad \text{Equation 14}$$

where $\hat{a}$ is highly likely not a "legitimate" action, i.e., $\hat{a} \notin \mathcal{A}$. Therefore, the proto-action a needs to be transformed (quantized) to a valid action in A, where the KNN classifier plays a role in.

2. K-Nearest Neighbor

Since the predicted proto-action of the actor network 202 is possibly not a valid action, $\hat{a}$ needs to be mapped to valid actions in $\mathcal{A}$. One natural solution could be a KNN function, that is, finding k actions in $\mathcal{A}$ that are closest to $\hat{a}$ by some distance metric ($L_2$ distance to name one).

More to the point, assume that there is a function denoted by $\xi_k$. This function takes in the proto-action a and returns the k nearest neighbors of that proto-action in $\mathcal{A}$ according to $L_2$ distance, formally $$\xi_k(\hat{a}) \underset{a \in \mathcal{A}}{\overset{nearest\ k}{\arg\min}} \|a - \hat{a}\|_2 \quad \text{Equation 15}$$

The output of $\xi_k(\hat{a})$ is a set of k actions in A that are the top k nearest neighbors to $\hat{a}$ which is denoted by $\mathcal{A}_k = \{a_1, a_2, \ldots, a_k\}$.

3. Critic Network

The critic network 204 is constructed as a function approximator parameterized by $\theta^{Q}$ mapping from the joint state space S and action space $\mathcal{A}$ to $\mathbb{R}$, that is $$Q(\cdot, \cdot \mid \theta^{Q}): \mathcal{S} \times \mathcal{A} \to \mathbb{R} \quad \text{Equation 16}$$

The critic network 204 essentially plays the role of a Q function that takes in the state and action and outputs the predicted Q value of this particular state-action pair. Since k actions are obtained from the KNN function, the critic network 204 then evaluates k state-action pairs (note that they share the same state) and selects the action that achieves the highest Q value $$a_t = \underset{a_t \in \mathcal{A}_k}{\arg\max}\, Q(s_t, a_t \mid \theta^{Q}) \quad \text{Equation 17}$$

4. Network Update

The actor network 202 aims at maximizing the output of the critic network 204 (the predicted Q value) given a particular state, the objective of which can be simply expressed as $J(\theta^{\mu}) = \mathbb{E}[Q(s, a|_{a=\mu(S|\theta^{\mu})})]$. Thus, the actor policy is updated using the deep deterministic policy gradient, which is given by $$-\nabla_{\theta^{\mu}} J(\theta^{\mu}) \approx -\mathbb{E}[\nabla_a Q(s, a) \nabla_{\theta^{\mu}} \mu(s \mid \theta^{\mu})] \quad \text{Equation 18}$$

$$\approx -\frac{1}{B} \sum_{b=1}^{B} \nabla_a Q(s, a)\big|_{s=s_b, a=\mu(s_b|\theta^{\mu})} \nabla_{\theta^{\mu}} \mu(s \mid \theta^{\mu})\big|_{s=s_b} \quad \text{Equation 19}$$

The objective of the critic network 204 is to estimate the Q value of the input state-action pair. Thus, the target can be constructed in the exact same way that is adopted in the deep Q-networks, which is given by $$y = \mathbb{E}\left[r + \gamma \max_{a_{t+1}} Q(s_{t+1}, a_{t+1} \mid \theta^{Q})\right] \quad \text{Equation 20}$$

The parameters of the critic network $\theta^{Q}$ are then updated based on the mean squared error over a particular mini-batch, which is given by $$\frac{1}{B} \sum_{b=1}^{B} (y_b - Q(s_b, a_b \mid \theta^{Q}))^2.$$

For the sake of computational stability, the actor network 202 and the critic network 204 have duplicates, referred to as the target actor and target critic networks. They are not trainable like the actor network 202 and the critic network 204, but they are utilized for calculating the targets. Despite them being not trainable, the parameters of the target actor and the critic network get updated using the parameters of the critic network 204 and the actor network 202 after a certain number of training iterations. Formally, it can be expressed as $$\theta^{Q'} \leftarrow \tau\theta^{Q} + (1 - \tau)\theta^{Q'} \quad \text{Equation 21}$$

$$\theta^{\mu'} \leftarrow \tau\theta^{\mu} + (1 - \tau)\theta^{\mu'} \quad \text{Equation 22}$$

where $\theta^{\mu'}$ and $\theta^{Q'}$ are the parameters of target actor network and target critic network, t is a non-negative hyper-parameter usually taking a value far less than 1.

B. DRL-Based Beam Pattern Design

This subsection describes in detail the proposed deep reinforcement learning (DRL)-based beam pattern design approach. The Wolpertinger architecture described above is adopted as the learning framework.

1. Reinforcement Learning Setup

To solve the problem with reinforcement learning, the corresponding building blocks of the learning algorithm are first specified.

State: Define the state $s_t$ as a vector that consists of the phases of all the phase shifters at the t-th iteration, that is, $s_t = [\theta_1, \theta_2, \ldots, \theta_M]^T$. This phase vector can be converted to the actual beamforming vector by applying Equation 1. Since all the phases in $s_t$ are selected from $\Theta$, and all the phase values in $\Theta$ are within $(-\pi, \pi]$, Equation 1 essentially defines a bijective mapping from the phase vector to the beamforming vector. Therefore, for simplicity, the term "beamforming vector" is used to refer to both this phase vector and the actual beamforming vector (the conversion is by Equation 1), according to the context.

Action: Define the action at as the element-wise changes to all the phases in $s_t$. Since the phases can only take values in Θ, a change of a phase means that the phase shifter selects a value from Θ. Therefore, the action is directly specified as the next state, i.e., $s_{t+1}=a_t$.

Reward: Define a ternary reward mechanism, i.e., the reward $r_t$ takes values from {+1,0,−1}. Compare the beamforming gain achieved by the current beamforming vector, denoted by $g_t$, with two values: (i) an adaptive threshold $\beta_t$, and (ii) the previous beamforming gain $g_{t-1}$. The reward is computed using the following rule $$g_t > \beta_t,\ r_t = +1;$$
$$g_t \le \beta_t \text{ and } g_t > g_{t-1},\ r_t = 0;$$
$$g_t \le \beta_t \text{ and } g_t \le g_{t-1},\ r_t = -1;$$

An adaptive threshold mechanism is adopted that does not rely on any prior knowledge of the channel distribution. The threshold has an initial value of zero. When the base station tries a beam and the resulting beamforming/combining gain surpasses the current threshold, the system updates the threshold by the value of this beamforming/combining gain. Besides, because the update of threshold also marks a successful detection of a new beam that achieves the best beamforming/combining gain so far, the base station also records this beamforming vector. As can be seen in this process, in order to evaluate the quality of a beam (or equivalently, calculate the reward), the system always tracks two quantities, which are the previous beamforming/combining gain and the best beamforming/combining gain achieved so far (i.e., the threshold).

2. Environment Interaction

As mentioned in Sections I and III, due to the possible hardware impairments, accurate channel state information is generally unavailable. Therefore, the network node (e.g., base station) can only resort to the receive power (or beamforming gain feedback reported by the users in a downlink setup) to adjust its beam pattern in order to achieve a better performance.

To be more specific, upon forming a new beam w, the base station uses this beam to receive the symbols transmitted by every user. Then, it averages all the combining gains as follows $$\bar{g} = \frac{1}{|\mathcal{H}_s|}\sum_{h_u\in\mathcal{H}_s}\left|\tilde{w}^H h_u\right|^2 \qquad \text{Equation 23}$$

where $\mathcal{H}_s$ represents the targeted user channel set. Recall that Equation 23 is the same as evaluating the objective function of Equation 11 with the current beamforming vector $\tilde{w}$.

Depending on whether or not the new average beamforming/combining gain surpasses the previous beamforming/combining gain as well as the current threshold, the base station gets either reward or penalty, based on which it can judge the "quality" of the current beam and decide how to move.

3. Exploration

The exploration happens after the actor network 202 predicts the proto-action $\hat{a}_{t+1}$ based on the current state (beam) $s_t$. Upon obtaining the proto-action, an additive noise is added element-wisely to $\hat{a}_{t+1}$ for the purpose of exploration, which is a customary way in the context of reinforcement learning with continuous action spaces. In the problem defined herein, temporally correlated noise samples generated by an Ornstein-Uhlenbeck process are used. It is worth mentioning that a proper configuration of the noise generation parameters has significant impact on the learning process.

Normally, the extent of exploration (noise power) is set to be a decreasing function with respect to the iteration number, which is commonly known as exploration-exploitation trade-off. Furthermore, the exact configuration of noise power should relate to specific applications. In the problem described herein, for example, the noise is directly added to the predicted phases. Thus, at the very beginning, the noise should be strong enough to perturb the predicted phase to any other phases in Θ. By contrast, when the learning process approaches to the termination (the learned beam already performs well), the noise power should be decreased to a smaller level that is only capable of perturbing the predicted phase to its adjacent phases in Θ.

4. Quantization

The "proto" beam (with exploration noise added) should be quantized in order to be a valid new beam. To this end, a KNN classifier is applied as described in Section IV.A.2. Furthermore, k=1 is specified in Equation 15, which is basically a nearest neighbor lookup. Therefore, each quantized phase in the new vector can be simply calculated as $$[s_{t+1}]_m = \arg\min_{\theta\in\theta}|\theta - [\hat{s}_{t+1}]_m|,\ \forall\ m = 1, 2, \ldots, M \qquad \text{Equation 24}$$

5. Forward Computation and Backward Update

The current state s, and the new state $s_{t+1}$ (recall that $s_{t+1}=a_t$ is directly set) are then fed into the critic network 204 to compute the Q value, based on which the targets of both the actor network 202 and the critic network 204 are calculated. This completes a forward pass. Following that, a backward update is performed to the parameters of the actor network 202 and the critic network 204. A pseudo code of the algorithm can be found in Algorithm 1.

Algorithm 1 DRL Based Beam Pattern Learning

1: Initialize actor network $\mu(s|\theta^\mu)$ and critic network $Q(s, a|\theta^Q)$ with random weights $\theta^\mu$ and $\theta^Q$
2: Initialize target networks μ' and Q' with the weights of actor and critic networks' $\theta^{\mu'} \leftarrow \theta^\mu$ and $\theta^{Q'} \leftarrow \theta^Q$
3: Initialize the replay memory $\mathcal{D}$, minibatch size B, discount factor γ
4: Initialize adaptive threshold β = 0 and the previous average beamforming gain $\bar{g}_1 = 0$
5: Initialize a random process $\mathcal{N}$ for action exploration
6: Initialize a random beamforming vector $w_1$ as the initial state $s_1$
7: for t = 1 to T do
8: Receive a proto-action from the actor network 202 with exploration noise $\hat{a}_t = \mu(s_t|\theta^\mu) + \mathcal{N}_t$
9: Quantize the proto-action to a valid beamforming vector $a_t$ according to (24)
10: Execute action $a_t$, observe reward $r_t$ and update state to $s_{t+1} = a_t$
11: Update the threshold ß and the previous beamforming gain $\bar{g}_t$
12: Store the transition $(s_t, a_t, r_t, s_{t+1})$ in $\mathcal{D}$
13: Sample a random mini batch of B transitions $(s_b, a_b, r_b, s_{b+1})$ from $\mathcal{D}$
14: Calculate target $y_b = r_b + \gamma Q'(s_{b+1}, \mu'(s_{b+1}|\theta^{\mu'})|\theta^{Q'})$
15: Update the critic network 204 by minimizing the loss $$L = \frac{1}{B}\sum_b\left(y_b - Q(s_b, a_b\,|\,\theta^Q)\right)^2$$

-continued

| Algorithm 1 DRL Based Beam Pattern Learning |
| --- |
| 16: Update the actor network 202 using the sampled policy gradient given by (19) |
| 17: Update the target networks every C iterations by (21) and (22) |
| 18: end for |

V. Beam Codebook Learning

This section proposes a multi-network DRL approach for solving Equation 8 and learning a beam codebook. The solution is built around the beam pattern learning approach described in Section IV. It could be briefly described as a pipeline of three key stages, namely clustering, assignment, and beam pattern learning.

Figure 3:
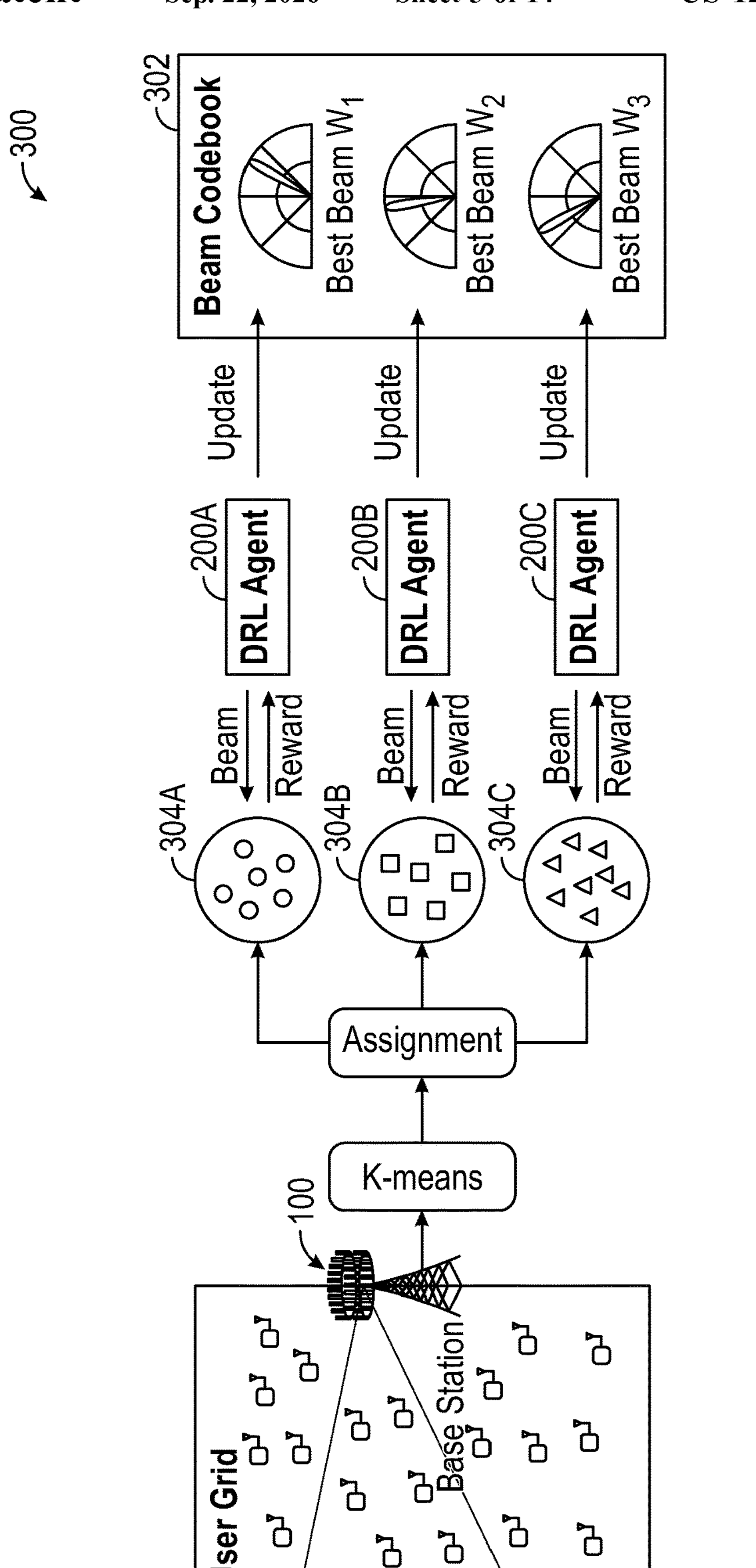
FIG. 3 is a schematic diagram of a proposed beam codebook design framework with DRL.

FIG. 3 is a schematic diagram of a design framework 300 for a beam codebook 302 with neural networks 200A, 200B, and 200C, which are of the DRL agent type. It shows the overall architecture, including the beam codebook 302 and user clusters 304A, 304B, and 304C. The first stage learns to partition the users in the environment into the user clusters 304A, 304B, and 304C based on how similar their channels are (without explicitly estimating those channels). These user clusters 304A, 304B and 304C are then assigned to different neural networks 200A, 200B, and 200C in a second stage. Such assignment needs to guarantee a form of consistency among the user clusters 304A, 304B, and 304C that are assigned to the DRL agents during the learning process. Finally, the third stage is where the beam pattern learning happens. Each of the DRL agents 200A, 200B, and 200C is expected to learn a beam pattern, and the collection of those patterns constructs the beam codebook 302. This approach is detailed in the following three subsections.

A. User Clustering

Users sharing similar channels are served by the same beam in the codebook. The question then becomes how to cluster the users' channels without knowing them, i.e., without performing expensive channel estimation. As a result of the constant modulus and limited resolution phase shifters, the set of feasible beamforming vectors for Equation 8 forms a huge yet finite subset of $\mathbb{C}^M$, and all those vectors live on the surface of the M-dimensional unit hypersphere. The proposed clustering method here relies on utilizing a random subset of those vectors, henceforth referred to as the sensing beams, for the purpose of gathering sensing information in the form of receive combining gain. This information is used to cluster those users, developing a rough sense of their distribution in the environment.

To perform the clustering, the method starts by constructing a matrix that is comprised of receive combining gains using the sensing beams. Formally, let $\mathcal{F}=\{f_1, f_2, \ldots, f_S\}$ be a set of S sensing beams that are randomly sampled from the feasible set of Equation 8 ( $\mathcal{W}$ and w are used to denote the learned codebook and beam, $\mathcal{F}$ and f are used to denote the sensing beam set and sensing beam), where $f_S \in \mathbb{C}^M$, $\forall_S \in \{1, \ldots, S\}$. Also, let $\mathcal{H}_{sen}=\{h_1, h_2, \ldots, h_{K'}\}$ denote the channels of the K' users that contribute to the clustering process, where $\mathcal{H}_{sen} \subseteq \mathcal{H}$. It is worth mentioning that these K' users do not need to be present in the environment at the same time. The receive combining gains used in the clustering algorithm can be collected over a relatively long period of time.

This is because essentially the learned clustering is a function of the major elements (e.g., walls, buildings, large trees, etc.) of the environment. Such scatterers/reflectors commonly stay static over long periods of time. As a result, the sensing data can be collected in an accumulative manner and the learned classifier does not need to be updated (re-trained) frequently. The objective then is to collect receive combining gains form the K' users for every beam $f_S \in \mathcal{F}$.

More specifically, the receive combining gains are used to construct the sensing matrix P $$P \triangleq \begin{bmatrix} |f_1^H h_1|^2 & \cdots & |f_1^H h_k|^2 & \cdots & |f_1^H h_{K'}|^2 \\ |f_2^H h_1|^2 & \cdots & |f_2^H h_k|^2 & \cdots & |f_2^H h_{K'}|^2 \\ \vdots & \ddots & \vdots & \ddots & \vdots \\ |f_S^H h_1|^2 & \cdots & |f_S^H h_k|^2 & \cdots & |f_S^H h_{K'}|^2 \end{bmatrix} \quad \text{Equation 25}$$

where each column in P has the receive combining gains from the same user for all sensing beams in $\mathcal{F}$. It is worth mentioning that since the receive combining gain is the only information source to the base station, the sensing matrix P actually incorporates all the information that the base station can leverage from the outside environment.

The sensing matrix is used to extract feature vectors that characterize the user distribution in the environment. Each column in P represents the receive gains of a single user in the environment. One could cluster the users by directly applying a clustering algorithm (such as k-means) on the columns of P. However, empirical evidence shows that this clustering does not yield meaningful partitioning of the users (or equivalently the channels). The reason for that could be attributed to the fact that the columns of P are restricted to the nonnegative orthant of the $\mathbb{R}^S$ vector space; this increases the likelihood of overlapping clusters, which are hard to separate with k-means. As an alternative, the column of P is transformed using pair-wise differences.

More precisely, the pair-wise differences of the elements of every column are computed, scaled, and stacked in a column vector as follows $$u_k = \left(\frac{1}{s}\sum_{S=1}^{S}|f_S^H h_k|^2\right)^{-1} \begin{bmatrix} |f_1^H h_k|^2 - |f_2^H h_k|^2 \\ |f_1^H h_k|^2 - |f_3^H h_k|^2 \\ \vdots \\ |f_{S-1}^H h_k|^2 - |f_S^H h_k|^2 \end{bmatrix}_{\frac{S(S-1)}{2}\times 1}, \quad \forall\, k = 1, 2, \ldots, K' \quad \text{Equation 26}$$

where $u_k$ is referred to as the feature vector of user k. The column vectors of all K' users are organized in a feature matrix $U=[u_1, U_2, \ldots, u_{K'}]$. This choice of transformation preserves the relation between the channel vector of a user and the sensing vectors, i.e., the sense of how close a channel vector to each sensing vector. However, it expresses that relation using a feature vector that could fall anywhere in the $\mathbb{R}^{S(S-1)/2}$ vector space (not restricted to the nonnegative orthant). The factor in Equation 26 expresses each element in the columns of U as a ratio of a pair-wise difference to the average power of the corresponding column of matrix P.

The clustering is applied on the columns of the feature matrix U to produce N clusters. The k-means algorithm is adopted to generate those clusters. The algorithm learns to partition the K' users (or equivalently their channels $\mathcal{H}_{sen}$) into N disjoint subsets $$\mathcal{H}_{sen} = \mathcal{H}_1 \cup \mathcal{H}_2 \cup \ldots \cup \mathcal{H}_N \quad \text{Equation 27}$$

where $\mathcal{H}_k \cap \mathcal{H}_l = \emptyset$, $\forall k \neq l$ and it is assumed that the subscript of each user group is also the corresponding label of that group.

The trained k-means algorithm is used to classify any new user coming into the environment. It is important to note here that the learned clustering is a function of the major elements of the environment, not the user distribution, i.e., it is mainly affected by major scatterers and their positions like walls, buildings, large trees, etc. Such scatterers commonly change over long periods of time, and consequently, the learned clusters do not need to be updated frequently.

B. Cluster Assignment

Since the clustering will be frequently repeated whenever there is a change in the environment, an important question arises: how to assign the new clusters to the existing DRL networks, with each of them learning one beam? The answer to this question defines the second stage in the proposed codebook learning approach. For the learning process to be meaningful, a network should consistently be assigned channel clusters that exhibit some form of similarity; the new cluster should be similar to the previous one in the sense that the network can improve its currently learned beam pattern but not change it completely. To that end, this cluster assignment task is formulated as a linear sum assignment problem, which can be solved efficiently using the Hungarian algorithm. In such problem, every pair of new cluster and DRL network is assigned a cost reflecting how suitable this cluster is to the network, and the goal is to find N unique cluster-network assignments that minimize the total cost sum (total suitability).

To perform the cluster-network assignment, a cost needs to be computed to measure suitability and guide the assignment process. Let $\hat{\mathcal{H}}_{sen} = \hat{\mathcal{H}}_1 \cup \hat{\mathcal{H}}_2 \cup \ldots \cup \hat{\mathcal{H}}_N$ be the new clusters obtained using the clustering algorithm described in Section V.A. As described in Section IV.B.2, the DRL network always tracks the beamforming vectors that achieve the best beamforming gain, which forms a set of "temporarily best" beamforming vectors, denoted by $Y = \{\hat{w}_1, \hat{w}_2, \ldots, \hat{w}_N\}$, where the subscripts stand for the indices of the N DRL networks.

It is proposed to use the average beamforming gain of each beamforming vector in Y computed on each cluster as the suitability measure. The result of that forms a cost matrix Z, where the value at the intersection of n-th row and n'-th column of Z stands for the average beamforming gain of the n-th temporarily best beamforming vector in Y on the n'-th channel cluster in $\hat{\mathcal{H}}_{sen}$. This value is calculated as $$Z_{nn'} = \frac{1}{|\hat{\mathcal{H}}_{n'}|} \sum_{h \in \hat{\mathcal{H}}_{n'}} |\hat{w}_n^H h|^2 \quad \text{Equation 28}$$

With the cost matrix, the cluster assignment task is formulated as a linear sum assignment problem, which is given by $$\min_X - \sum_{n=1}^{N} \sum_{n'=1}^{N} X_{nn'} Z_{nn'} \quad \text{Equation 29}$$

$$\text{s.t. } X \text{ is a permutation matrix} \quad \text{Equation 30}$$

This problem can be efficiently solved by using Hungarian algorithm, the results of which are N association tuples $$(\hat{w}_N, \hat{\mathcal{H}}_{n'}),\ n, n' \in \{1, 2, \ldots, N\}$$

In other words, the cluster assignment step forms a bijective mapping from Y to the set of channel groups $$\{\hat{w}_1, \hat{w}_2, \ldots, \hat{w}_N\} \Leftrightarrow \{\hat{\mathcal{H}}_1, \hat{\mathcal{H}}_2, \ldots, \hat{\mathcal{H}}_N\} \quad \text{Equation 31}$$

C. Neural Network Update and Fine-Tuning

Upon obtaining the clustered channels and their assignment (Equation 31), the problem of Equation 8 is essentially decomposed into N independent sub-problems which is given by Equation 11. Each DRL network adjusts its own beam based on the assigned user cluster. They only consider the receive combining gains from their designated users. User clustering and cluster assignment are two key stages that enable adaptability and empower the proposed solution with capability of dealing with dynamic environment. Practically speaking, it is impossible to fix all the users until a good beam codebook is learned. Instead, the learning cluster is kept and the users are assigned as they change over time, which partially reflects the dynamics of the environment. The proposed beam codebook approach accounts for such practical considerations and is able to learn beam codebooks that adapt to the environment. The complete beam codebook learning algorithm is given in Algorithm 2.

Algorithm 2 User Clustering and Cluster Assignment Algorithm

1: Initialize a sensing beam set $\mathcal{F} = \{f_1, f_2, \ldots, f_S\}$
2: Initialize the temporarily best beam set $Y = \{\hat{w}_1, \hat{w}_2 \ldots, \hat{w}_N\}$
3: Construct sensing matrix P by (25)
4: Transform sensing matrix P to feature matrix U by applying (26) to the columns of P
5: Use k-means algorithm to cluster the columns of U into N clusters
6: while environment has not changed do
7: Randomly sample a subset of users $\hat{\mathcal{H}}$ from $\mathcal{H}$
8: Partition sampled channels using the trained k-means classifier to $\hat{\mathcal{H}} = \hat{\mathcal{H}}_1 \cup \hat{\mathcal{H}}_2 \cup \ldots \cup \hat{\mathcal{H}}_N$ channel clusters
9: Construct the matrix Z using $Y$ and the clustering result of $\hat{\mathcal{H}}$ based on (28)
10: Solve the optimization problem (29) by applying Hungarian algorithm
11: Assign the user clusters to DRL networks based on the association relationship given by the permutation matrix X
12: Train the N DRL networks
13: if training saturated then
14: Fine-tune the learned beam pattern using perturb-and-quantize operations
15: end if
16: end while
17: Go to line 1

The beam pattern learning proceeds as described in Section IV.B with one minor difference, a final perturb-and-quantize fine-tuning step. This step is basically applied after the DRL agent reaches training saturation. It is composed of three simple operations: (i) perturb the beam vector with exploration noise, (ii) quantize the perturb beam vector, and (iii) evaluate the quantized beam vector on the assigned cluster of users. The training algorithm loops over the three operations until the received beamforming gain saturates again. The goal of this last stage is to fine-tune the beam pattern without the relatively expensive agent-training process.

VI. Experiments Setup and Network Training

To evaluate the performance of the proposed solutions, two scenarios are considered. They are designed to represent two different communication settings. The first has all users experiencing LOS connection with a network node (e.g., a base station), while the other has them experiencing NLOS connection. The following two subsections provide more details on the scenarios and the training process.

A. Communication Scenarios and Datasets

Figure 4A:
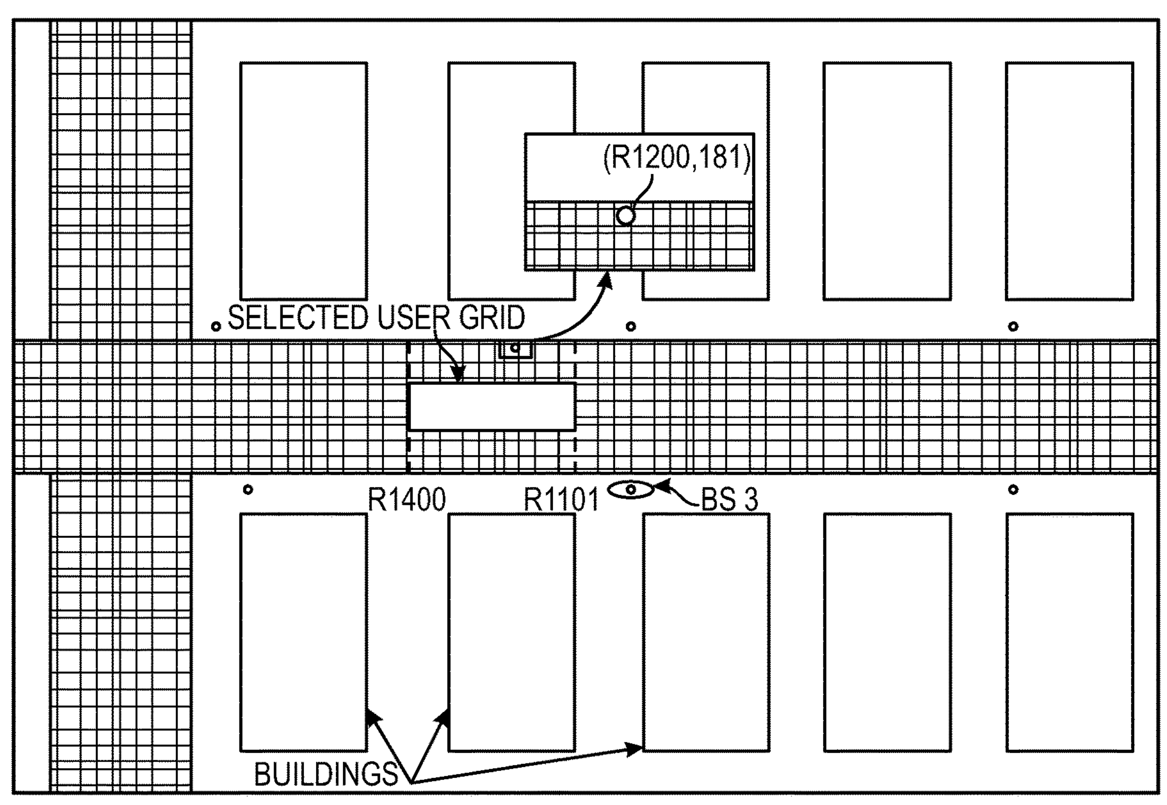
FIG. 4A is a schematic diagram of an outdoor line-of-sight (LOS) scenario.
Figure 4B:
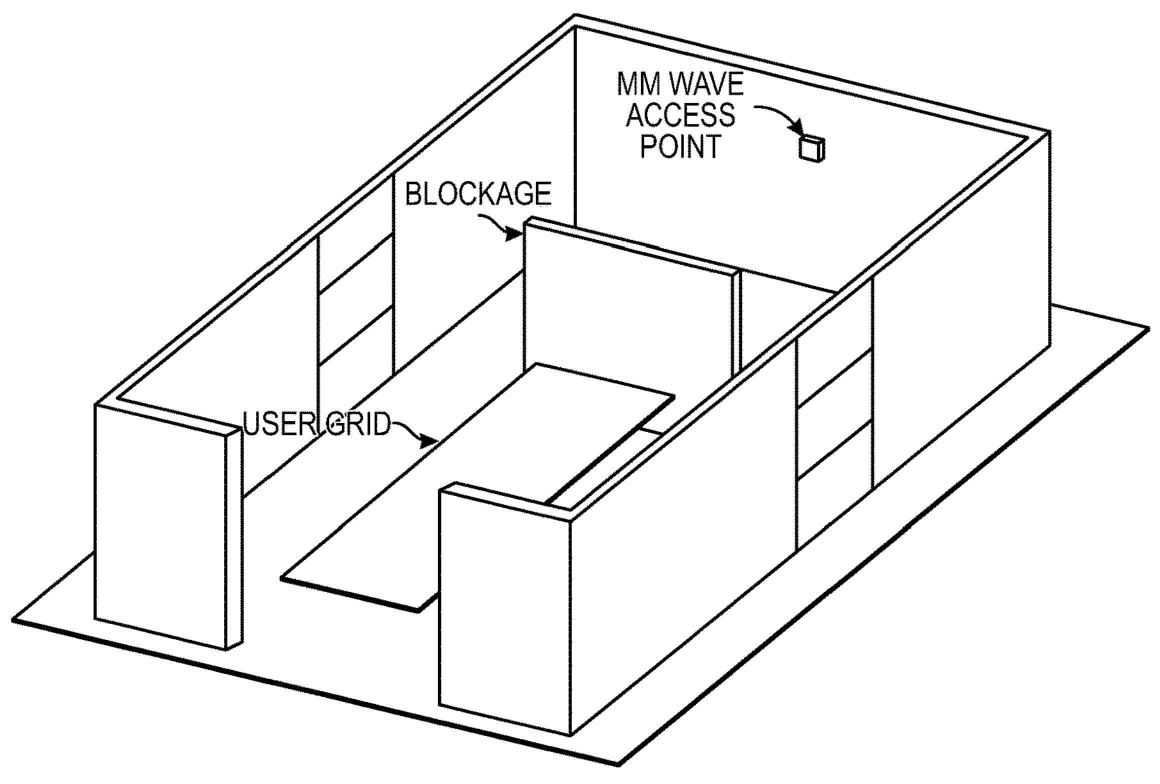
FIG. 4B is a schematic diagram of an indoor non-LOS (NLOS) scenario.

FIGS. 4A and 4B show two perspective views of communication scenarios considered for performance evaluation. FIG. 4A is a schematic diagram of an outdoor LOS scenario. FIG. 4B is a schematic diagram of an indoor NLOS scenario. The first scenario is an outdoor LOS scenario where all users have LOS connection with the mmWave network node, with an operating frequency of 60 GHz. The second one is chosen to be an indoor NLOS scenario where all the users have NLOS connection with the mmWave network node, with an operating frequency of 28 GHz. Both scenarios are part of the DeepMIMO dataset.

Using the DeepMIMO scripts, two sets of channels, namely $\mathcal{S}^{LOS}$ and $\mathcal{S}^{NLOS}$, are generated, one for each scenario. Table I shows the data generation hyper-parameters. The datasets take into account that the hardware impairments are generated based on the LOS scenario. While the proposed solution can deal with general impairments, only two main sources of impairments are considered, namely, antenna spacing and phase mismatches. Multiple datasets are generated based on different levels of impairments, measured by the standard deviations of antenna spacing and phase mismatches. Without distinction of them, those datasets with impairments are denoted as $\mathcal{S}^{cLOS}$ (with cLOS referring to corrupted LOS).

TABLE I

Hyper-parameters for channel generation

| Parameter | value | |
|---|---|---|
| Name of scenario | O1_60 | I2_28B |
| Active network node | 3 | 1 |
| Active users | 1101 to 1400 | 201 to 300 |
| Number of antennas (x, y, z) | (1, 32, 1) | (32, 1, 1) |
| System BW | 0.5 GHz | 0.5 GHz |
| Antenna spacing | 0.5 | 0.5 |
| Number of OFDM sub-carriers | 1 | 1 |
| OFDM sampling factor | 1 | 1 |
| OFDM limit | 1 | 1 |
| Number of multi paths | 5 | 5 |

TABLE II

Hyper-parameters for model training

| Parameter | value | |
|---|---|---|
| Models | Actor | Critic |
| Replay memory size | 8192 | 8192 |
| Mini-batch size | 1024 | 1024 |
| Learning rate | $10^{-3}$ | $10^{-3}$ |
| Weight decay | $10^{-2}$ | $10^{-3}$ |

B. Machine Learning Model Structure and Pre-Processing

While multiple datasets are generated, the learning architecture is the same, which is based on the DDPG framework. It is made up of the actor network 202 and the critic network 204. The input of the actor network 202 is the state, i.e., the phases of the phase shifters 222, hence with a dimension of M. There are two hidden layers, all comprising 16M neurons and followed by Rectified Linear Unit (ReLU) activations. The output of the actor network is the predicted action, which also has a dimension of M and is followed by hyperbolic tangent (tan h) activations scaled by $\pi$.

For the critic network 204, the input is the concatenation of the state and action, so it has a dimension of 2M. There are also two hidden layers, all with 32M neurons and followed by ReLU activations. The output of the critic network 204 stands for the predicted Q value of the input state-action pair, which is a real scalar (dimension of 1). The hyper-parameters for training can be found in Table II.

The training process starts by data pre-processing. The channels in each dataset are normalized to improve the training experience. The channel normalization using the maximum absolute value in the dataset helps the network undergo a stable and efficient training. Formally, the normalization factor is found as follows:

$$\Delta = \max_{h_u \in \mathcal{S}} |[h_u]_m| \quad \text{Equation 32}$$

where $\mathcal{S} \in \{\mathcal{S}^{LOS}, \mathcal{S}^{NLOS}, \mathcal{S}^{cLOS}\}$ and $[h_u]_m$ is the m-th element in channel vector $h_u$.

VII. Simulation Results

This section evaluates the performance of the proposed solution using the scenarios described in Section VI. In a nutshell, the numerical results show that the proposed learning solutions can adapt to different environments, user distributions as well as hardware impairments, without the need to estimate the channels. The performance of the learned codebook is compared with a classical beamsteering codebook, where the beamforming vectors are spatial matched filters for the single-path channels. Therefore, they have the same form of the array response vector and can be parameterized by a simple angle. In the simulation, depending on the adopted size of the classical beamsteering codebook, those angles are evenly spaced in the range of $[0, \pi]$. Next, Section VII.A. first evaluates the performance of the beam pattern learning solution, and then Section VII.B. evaluates the beam codebook learning solution.

A. Beam Pattern Learning

The proposed DRL-based beam pattern learning solution is first evaluated on learning a single beam that serves a single user with LOS connection to the network node (e.g., base station). The selected target user is highlighted in FIG. 4A with a dot.

Figure 5:
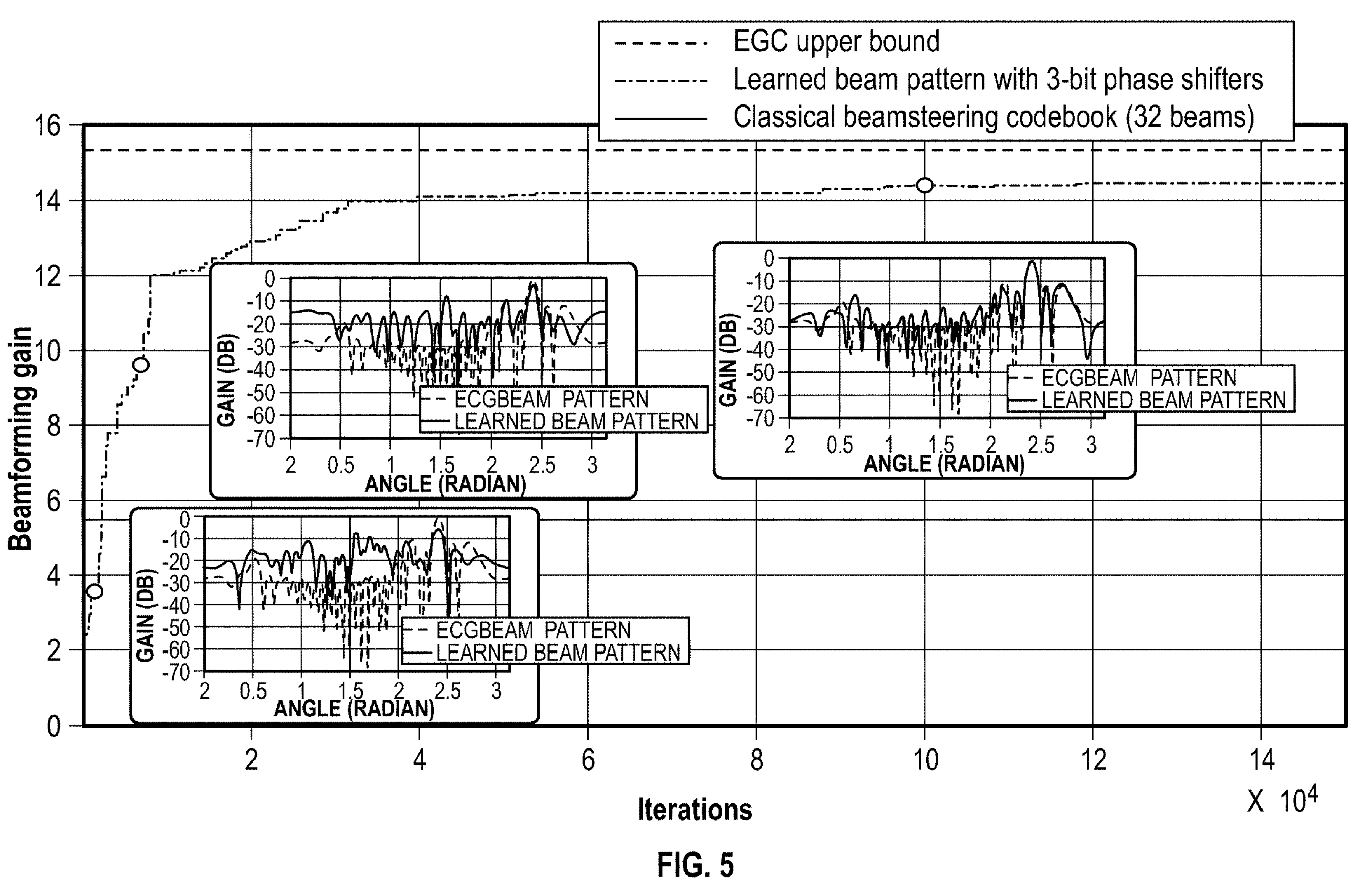
FIG. 5 is a graphical representation of beam pattern learning results for a single user with LOS connection to a base station.

FIG. 5 is a graphical representation of beam pattern learning results for a single user with LOS connection to a base station. The base station employs a perfect uniform linear array with 32 antennas and 3-bit phase shifters. This figure shows the learning process and the beam patterns learned at three different stages during the iterations. The learned beam patterns are plotted using a dot-dash line, and the equal gain combining/beamforming vector is plotted using a dashed line.

The performance of the learned single beam is compared with a 32-beam classical beamsteering codebook. Classical beamsteering codebook normally performs very well in LOS scenario. However, the proposed method achieves higher beamforming gain than the best beam in the classical beamsteering codebook, with negligible iterations. More interestingly, with less than $4\times10^{4}$ iterations, the proposed solution can reach more than 90% of the EGC upper bound. It is worth mentioning that the EGC upper bound can only be reached when the user's channel is known and unquantized phase shifters are deployed. By contrast, the proposed solution can finally achieve almost 95% of the EGC upper bound with 3-bit phase shifters and without any channel information. The learned beam patterns are also plotted at three different stages (iteration 1000, 5000, and 100000) during the learning process, which helps demonstrate how the beam pattern evolves over time.

As shown in FIG. 5, at iteration 1000, the learned beam pattern has very strong side lobes, weakening the main lobe gain to a great extent. At iteration 5000, the gain of the main lobe becomes stronger. However, there are still multiple side lobes with relatively high gains. Finally, at iteration 100000, it can be seen that the main lobe has quite strong gain compared to the other side lobes, having at least 10 dB gain over the second strongest side lobe. And most of the side lobes are below-20 dB. Besides, the learned beam pattern captures the EGC beam pattern very well, which explains the good performance it achieves. The slight mismatching is mainly caused by the use of quantized phase shifters, which is with only 3-bit resolution.

Figure 6A:
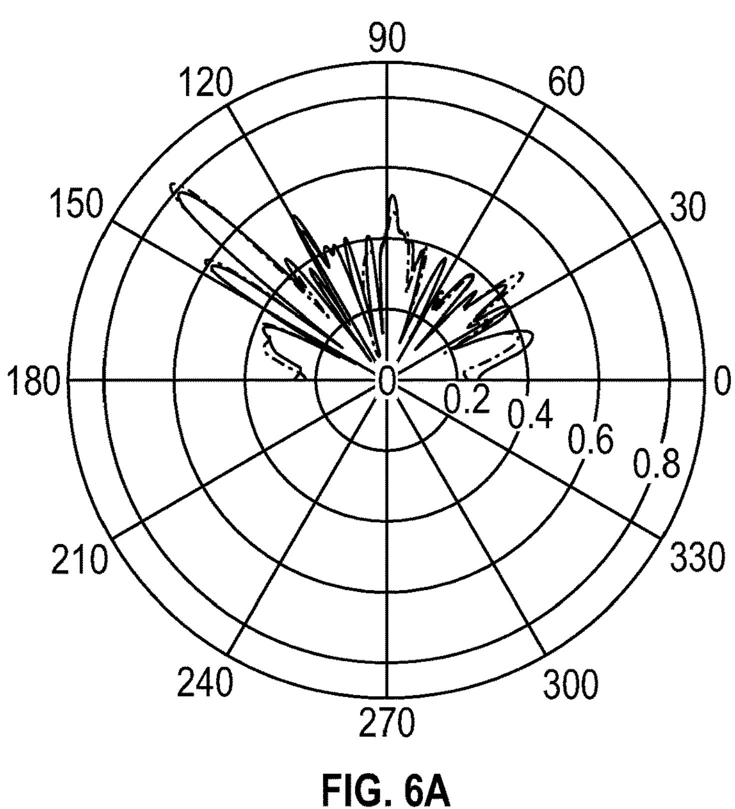
FIG. 6A is a graphical representation of the beam patterns for an equal gain combining/beamforming vector and a learned beam for a single user with LOS connection to the base station.
Figure 6B:
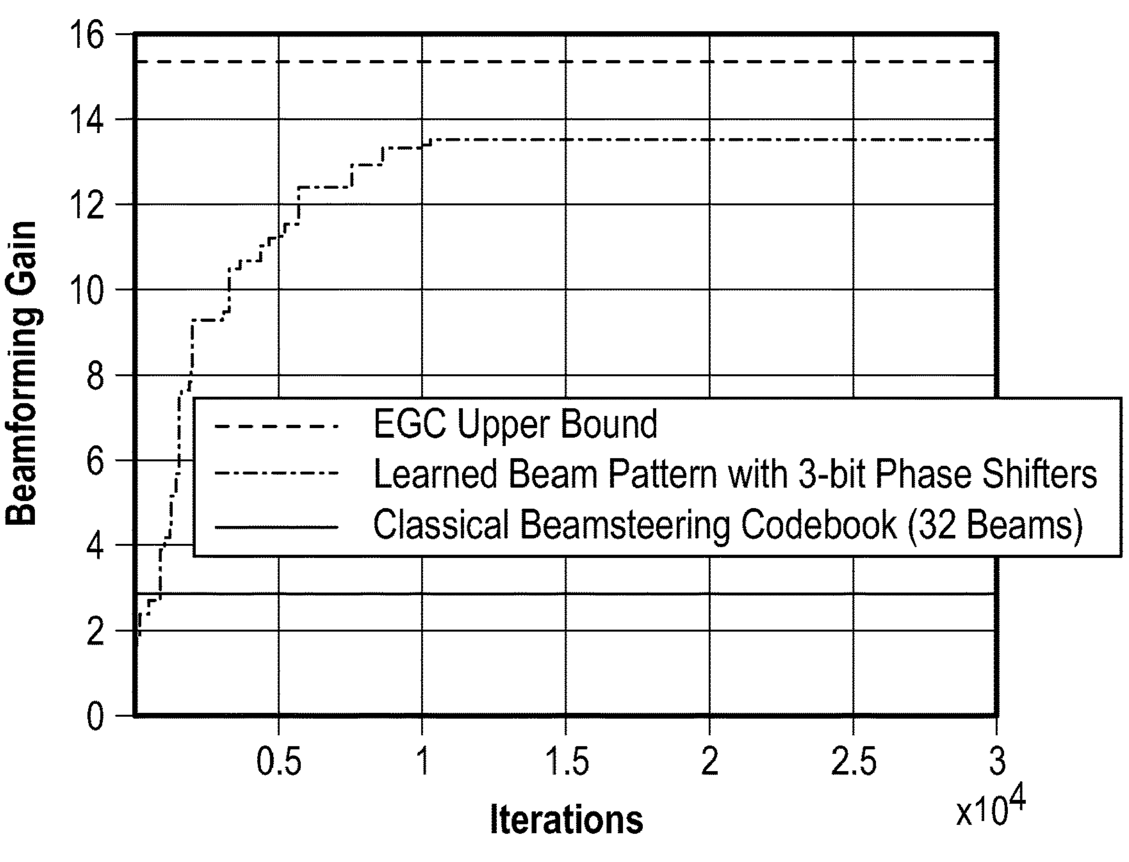
FIG. 6B is a graphical representation of the learning process of FIG. 6A.

FIG. 6A is a graphical representation of the beam patterns for an equal gain combining/beamforming vector and a learned beam for a single user with LOS connection to the base station. FIG. 6B is a graphical representation of the learning process of FIG. 6A. The base station employs a uniform linear array with 32 antennas and 3-bit phase shifters, where hardware impairments exist. The standard deviation of the antenna spacing is 0.11, and the standard deviation of the phase mismatches is $0.32\pi$. The proposed beam pattern learning solution is also evaluated on a more realistic situation where hardware impairments exist (with the same user considered above). The simulation results confirm that the proposed solution is competent to learn optimized beam pattern that adapts to hardware, showing the capability of compensating the unknown hardware mismatches.

FIG. 6A shows the beam patterns for both EGC beam and the learned beam. At the first glance, the learned beam appears distorted and has lots of side lobes. However, the performance of such a beam is excellent, which can be explained by comparing its beam pattern with the EGC beam. As can be seen from the learned beam pattern, the proposed solution intelligently approximates the optimal beam, where all the dominant lobes are well captured. By contrast, the classical beamsteering codebook fails when the hardware is not perfect, as depicted in FIG. 6B. This is because the distorted array pattern incurred by the hardware impairment makes the pointed classical beamsteering beams only able to capture a small portion of the energy, resulting in a huge degradation in beamforming gain.

The learned beam shown in FIG. 6A is capable of achieving more than 90% of the EGC upper bound with approximately only $10^4$ iterations, as shown in FIG. 6B. This is especially interesting for the fact that the proposed solution does not rely on any channel state information. As is known, the channel estimation in this case relies first on a full calibration of the hardware, which is a hard and expensive process.

B. Beam Codebook Learning

This subsection evaluates the proposed DRL-based beam codebook learning solution in several scenarios. The task of learning a beam codebook with multiple beams is significantly different than learning a single beam (pattern) from computational complexity perspective. For example, for a base station with 32 antennas and 4-bit discrete phase shifters, there are 1632 possible beamforming vectors, from which a single vector is selected in the beam pattern learning case. However, learning a codebook will further result in finding combinations out of this huge pool. To address this problem, a clustering and assignment approach is proposed, given by Algorithm 2, that essentially decomposes the huge task into N independent, parallel and relatively lightweight sub-tasks. This facilitates the problem of learning a codebook with multiple beams.

Before diving into the discussions, it is important to mention that due to the stationarity of the scenario, clustering/assignment is performed only once in the simulations. If the environment is more dynamic, the clustering/assignment is expected to be done more frequently.

Figures 7A, 7B:
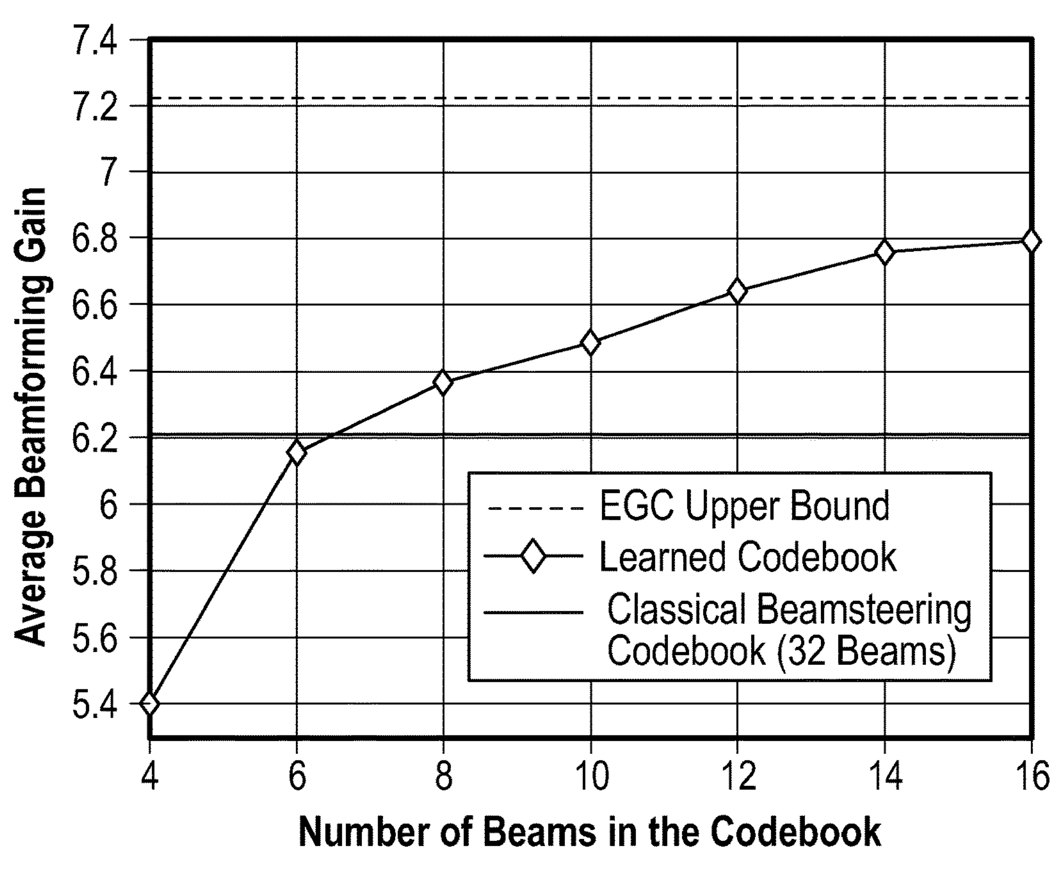
FIG. 7A is a graphical representation of the learning results of the proposed DRL-based codebook learning solution under a LOS scenario where the base station employs a perfect uniform linear array.
FIG. 7B is a schematic diagram of the result of clustering users into 4 groups in the solution of FIG. 7A.

FIG. 7A is a graphical representation of the learning results of the proposed DRL-based codebook learning solution under a LOS scenario where the base station employs a perfect uniform linear array. This plots the average beamforming gain versus the number of beams in the codebook under the LOS scenario shown in FIG. 4A, where the network node adopts an ideal uniform linear array. It shows that the average beamforming gain is monotonically increasing as the number of beams increases. Besides, with only 6 beams, the proposed solution has almost the same performance as a 32-beam classical beamsteering codebook. And with 8 beams, it outperforms the 32-beam classical beamsteering codebook. This exhibits how the proposed approach adapts the beams based on the user distributions. As a result, it significantly reduces the training overhead by avoiding scanning directions where there is no user at all.

FIG. 7B is a schematic diagram of the result of clustering users into 4 groups in the solution of FIG. 7A. This presents the clustering result for the users in this LOS scenario. This is a very important step for learning multiple beams. As stated at the end of Section III, the ultimately optimized codebook should have a collection of beams, where each one of them is optimized to serve a group of users with similar channels. The clustering stage is the first step that the proposed solution takes to attain that objective.

Figure 7C:
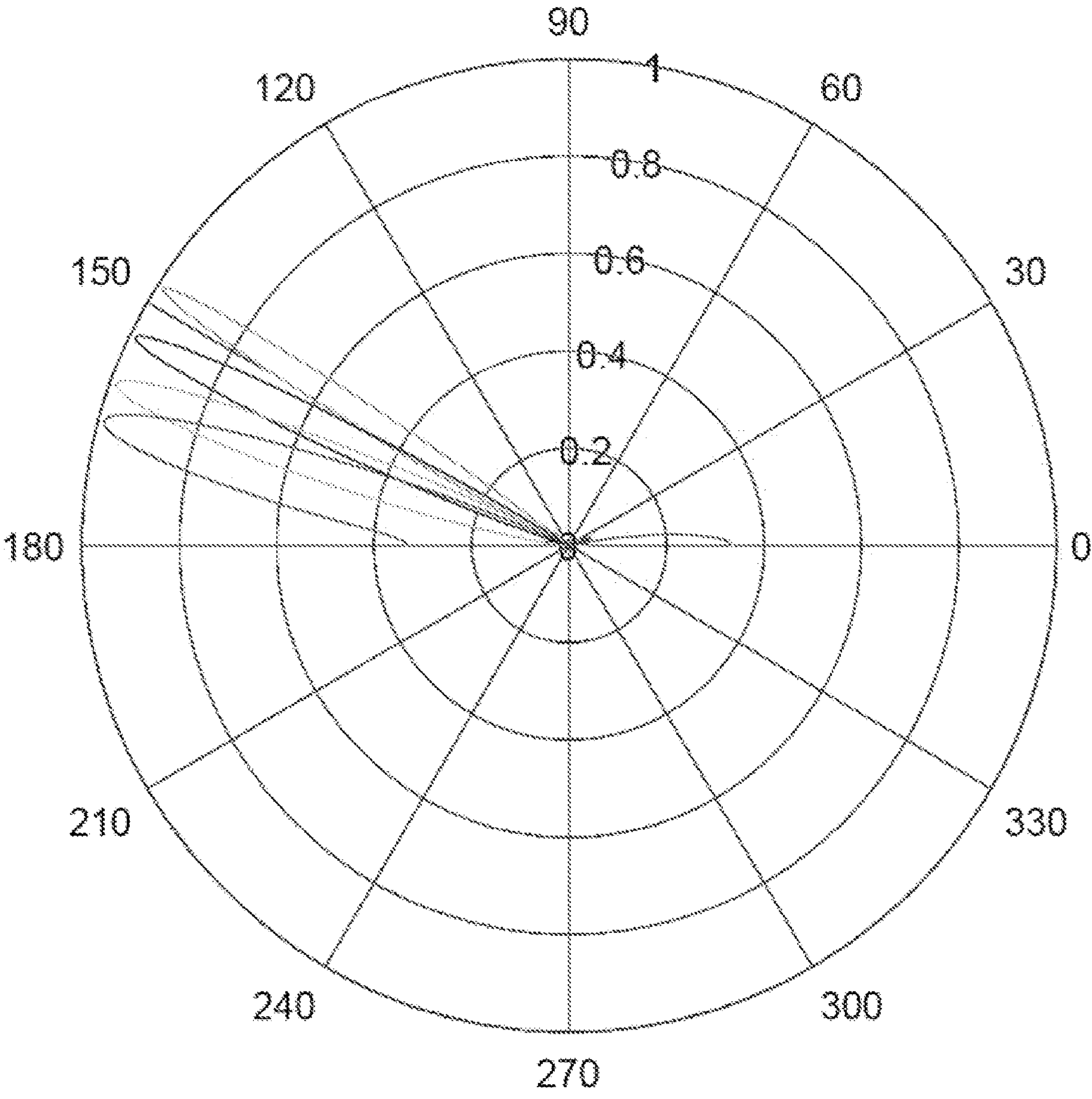
FIG. 7C is a graphical representation of the beam patterns for the learned 4-beam codebook in the solution of FIG. 7A.

FIG. 7C is a graphical representation of the beam patterns for the learned 4-beam codebook in the solution of FIG. 7A. As shown in the learning result, the proposed solution can cluster users based on the similarity of their channels, and form beams to cover the user grid in order to achieve high beamforming gain.

Figure 8A:
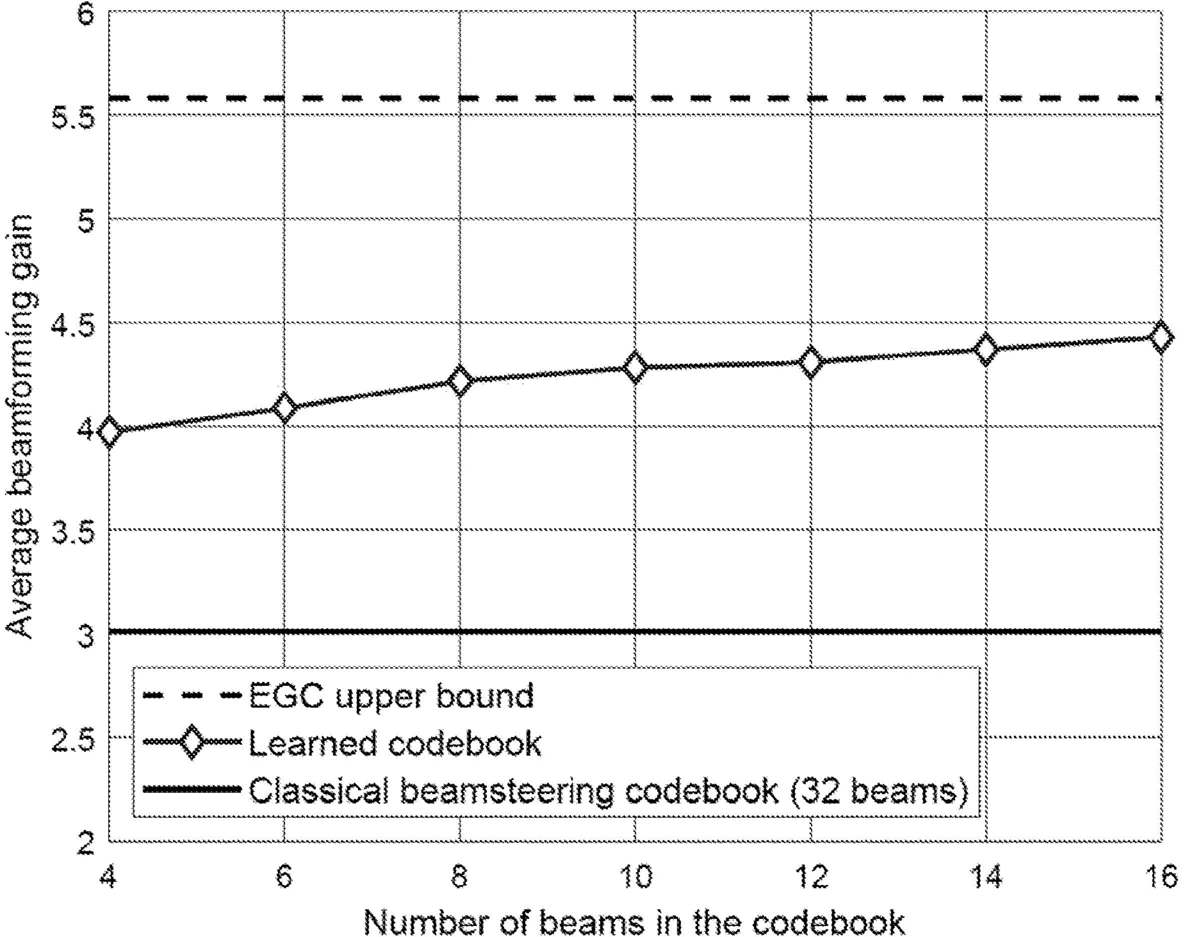
FIG. 8A is a graphical representation of average beamforming gain versus the number of beams in the codebook, illustrating learning results of the proposed DRL-based codebook solution under a NLOS scenario.

FIG. 8A is a graphical representation of average beamforming gain versus the number of beams in the codebook, illustrating learning results of the proposed DRL-based codebook solution under a NLOS scenario. The proposed solution is also evaluated under a NLOS scenario shown in FIG. 4B, where all the users experience NLOS connection with an indoor mmWave access point. As can be seen in FIG. 8A, the proposed solution surpasses a 32-beam classical beamsteering codebook with only 4 beams. Further, the proposed solution is gradually approaching the EGC upper bound as the size of codebook increases. It should be noted that in order to achieve the EGC upper bound: (i) The number of beams in the codebook should be equal to the number of users, (ii) continuous phase shifters should be adopted, and most importantly, (iii) accurate channel state information is needed. By contrast, with only 16 beams and 4-bit phase shifters, the proposed solution can reach 80% of the EGC upper bound, relying only on the receive combining gains. In other words, the proposed approach not only significantly reduces the beam training overhead but also avoids the prohibitive cost of estimating the channels.

Figure 8B:
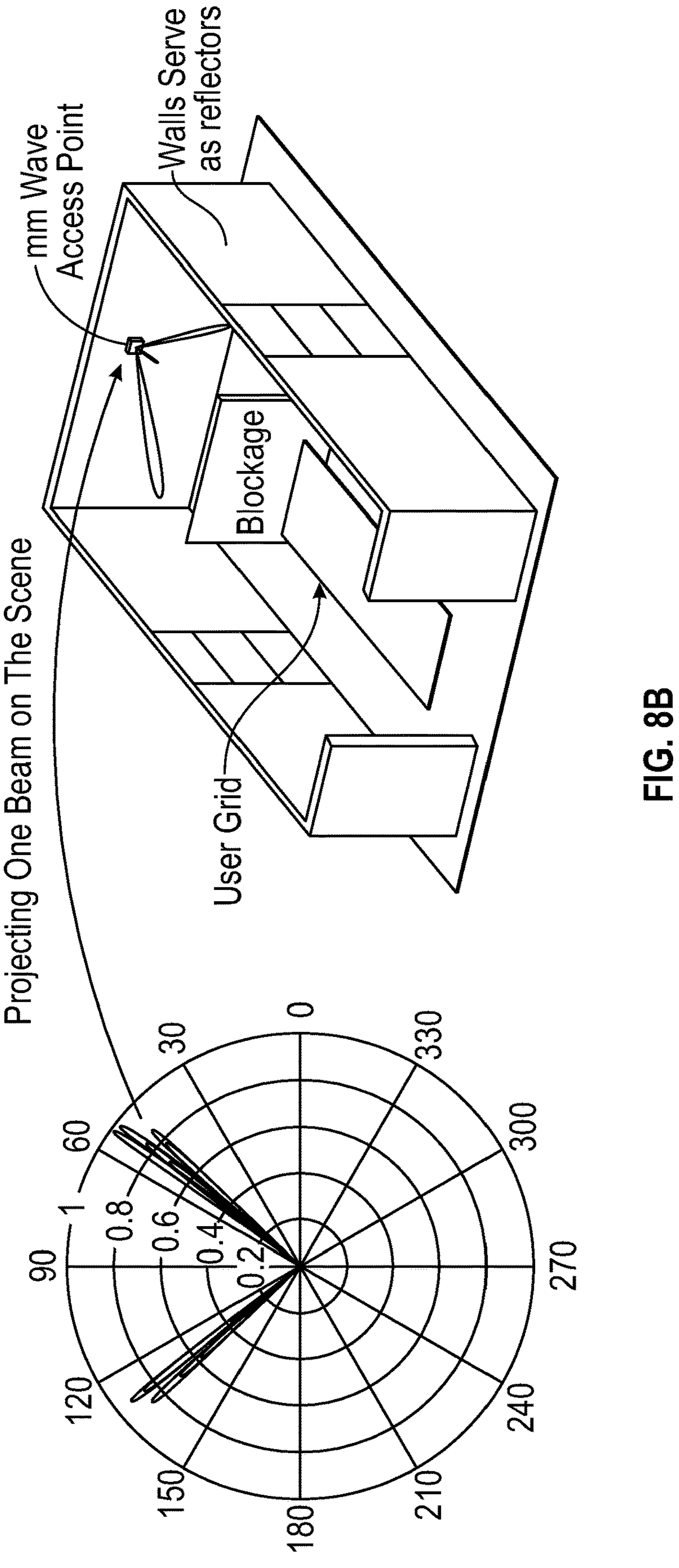
FIG. 8B is a schematic diagram of the beam patterns of the learned 16-beam codebook in FIG. 8A and how one of the learned beams with multi-lobes fits the propagation environment.

FIG. 8B is a schematic diagram of the beam patterns of the learned 16-beam codebook in FIG. 8A and how one of the learned beams with multi-lobes fits the propagation environment. To gain more insight, the beam patterns of the learned 16-beam codebook are plotted and one of the beams is projected on the adopted scene. It can be seen that the learned beams have multi-lobes, different from the pointed beams learned in the LOS scenario. However, such beams achieve better performance compared with the pointed beamsteering beams. The reason becomes clear when it is observed that because of the blockage in the considered scenario, the signals transmitted by the users have to resort to reflections to reach the access point, where the walls at both sides of the room serve as major reflectors. This clearly shows how the proposed solution adapts the beam pattern to the propagation environment, gaining more power by receiving signals from multiple directions.

Learning codebooks that overcome the hardware impairments is one of the most important application cases of the DRL-based codebook learning approach. Therefore, the proposed solution is evaluated under the same LOS scenario shown in FIG. 4A, with hardware impairments being considered. Furthermore, the solution is tested under different standard deviations of the phase mismatch, where a fixed antenna spacing mismatch with a standard deviation of 0.11 is assumed. For each channel dataset, an 8-beam codebook is learned and compared with a 32-beam classical beamsteering codebook.

Figure 9A:
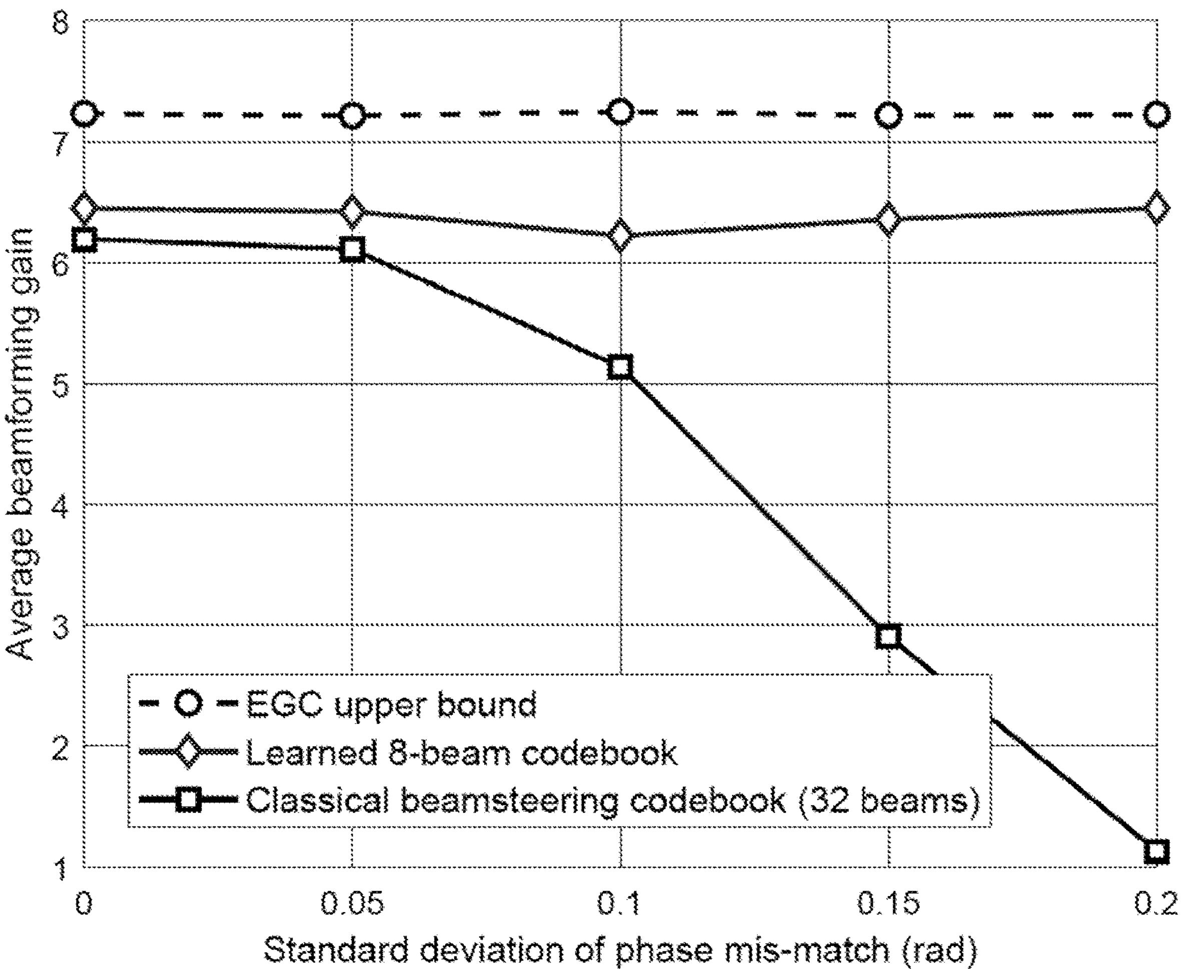
FIG. 9A is a graphical representation of the average beamforming gain versus the standard deviation of phase mismatch, where the antenna spacing mismatch has a fixed standard deviation of 0.11, illustrating learning results of the proposed DRL-based solution under the same LOS scenario with hardware impairments being considered.

FIG. 9A is a graphical representation of the average beamforming gain versus the standard deviation of phase mismatch, where the antenna spacing mismatch has a fixed standard deviation of 0.11, illustrating learning results of the proposed DRL-based solution under the same LOS scenario with hardware impairments being considered. The result shows that as the standard deviation of the phase mismatch increases, i.e., the hardware impairments become more severe, the proposed DRL-based solution keeps a balanced performance. The slight fluctuation is mainly caused by the uncertainty nature of solving the highly non-convex problem in Equation 8. By contrast, the performance of the 32-beam classical beamsteering codebook degrades drastically as the level of hardware impairment increases. This empirically shows the robustness of the proposed codebook learning approach to different levels of hardware impairments.

Figure 9B:
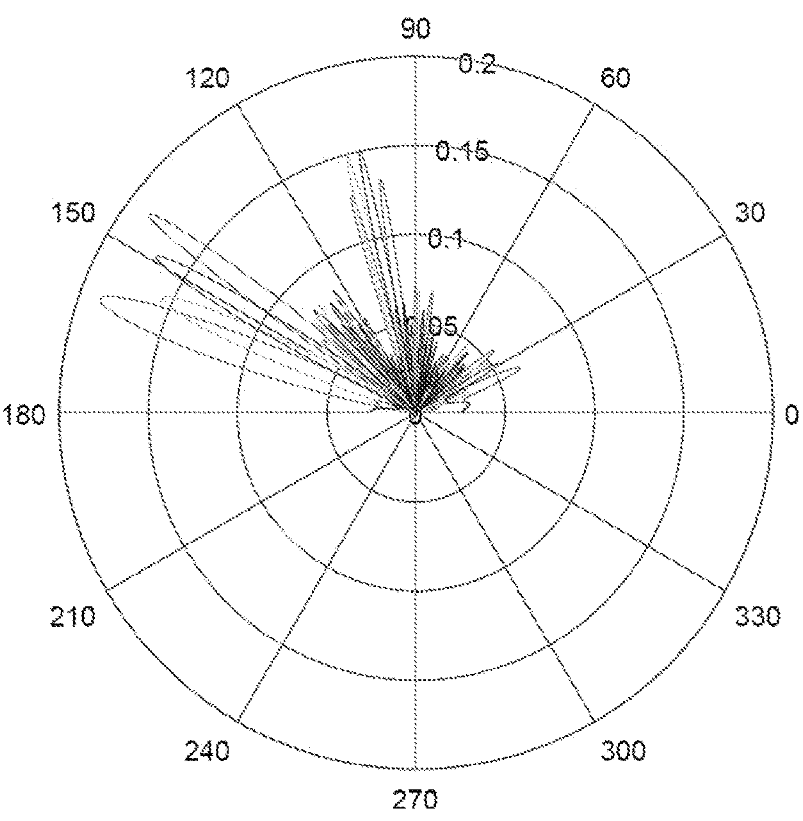
FIG. 9B is a graphical representation of the beam patterns of 4 beams in the learned codebook of FIG. 9A projected onto the "clean" angular space.

FIG. 9B is a graphical representation of the beam patterns of 4 beams in the learned codebook of FIG. 9A projected onto the "clean" angular space. It can be seen that these beams have quite distorted beam patterns like the single beam case shown in FIG. 6A.

Figure 9C:
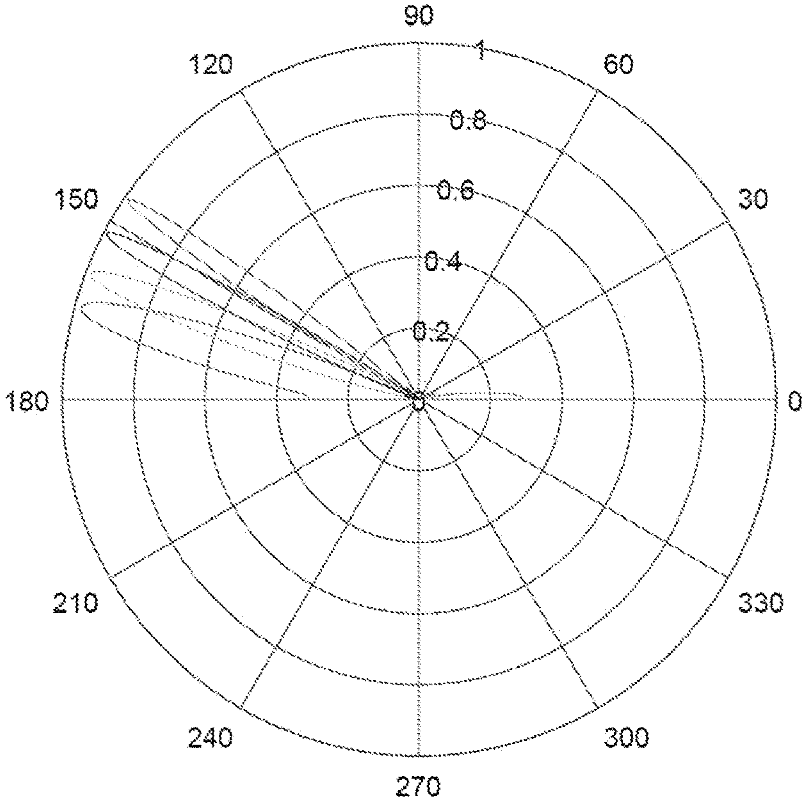
FIG. 9C is a graphical representation of the same beams as in FIG. 9B projected onto the "corrupted" angular space.

FIG. 9C is a graphical representation of the same beams as in FIG. 9B projected onto the "corrupted" angular space. This shows that these distorted beam patterns indeed match the hardware impairments. The learned beams actually appear "clean" and pointy in the corrupted angular space. This empirically verifies the capability of the proposed solution in learning beams that adapt to the flawed hardware.

VIII. Beam Codebook Intelligent Learning Process

Figure 10:
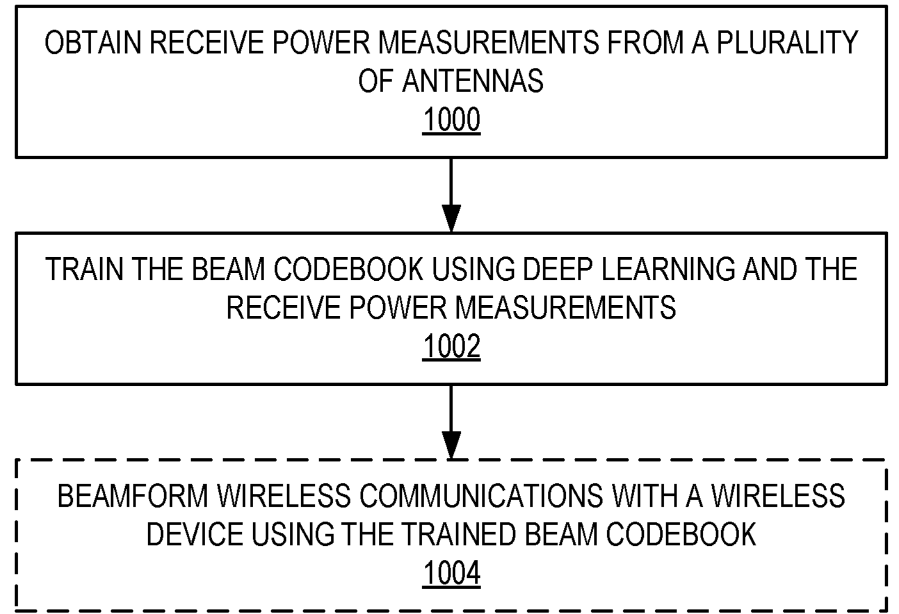
FIG. 10 is a flow diagram illustrating a process for intelligently learning a beam codebook for multi-antenna wireless communications.

FIG. 10 is a flow diagram illustrating a process for intelligently learning a beam codebook for multi-antenna wireless communications. Dashed boxes represent optional steps. The process begins at operation 1000, with obtaining receive power measurements from a plurality of antennas. The process continues at operation 1002, with training the beam codebook using deep learning and the receive power measurements. The process optionally continues at operation 1004, with beamforming wireless communications with a wireless device using the trained beam codebook.

Although the operations of FIG. 10 are illustrated in a series, this is for illustrative purposes and the operations are not necessarily order dependent. Some operations may be performed in a different order from that presented. Further, processes within the scope of this disclosure may include fewer or more steps than those illustrated in FIG. 10.

IX. System Diagram

Figure 11:
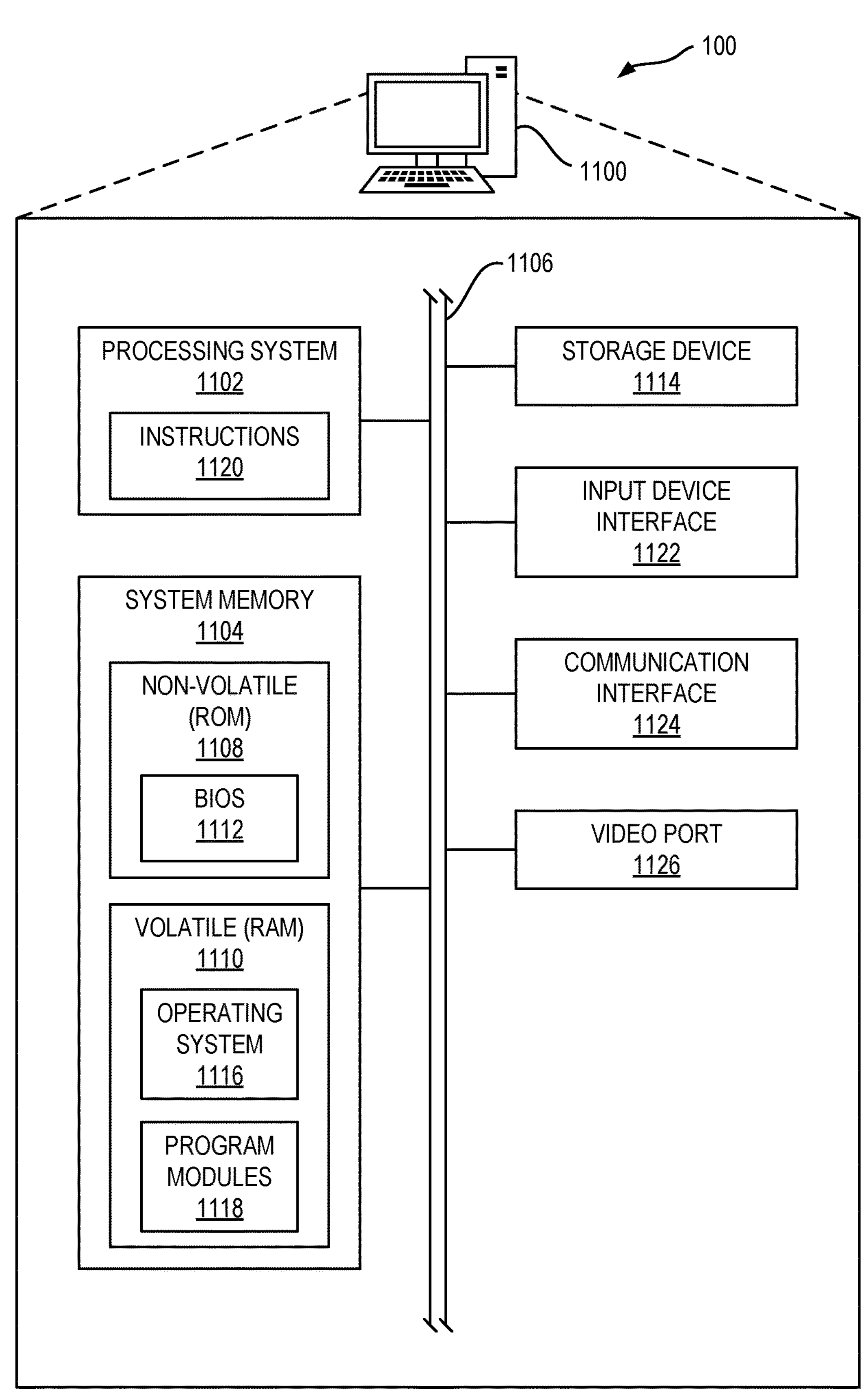
FIG. 11 is a block diagram of a network node suitable for implementing the DRL-based codebook learning solution according to embodiments disclosed herein.

FIG. 11 is a block diagram of a network node 100 suitable for implementing the DRL-based codebook learning solution according to embodiments disclosed herein. The network node 100 includes or is implemented as a computer system 1100, which comprises any computing or electronic device capable of including firmware, hardware, and/or executing software instructions that could be used to perform any of the methods or functions described above. In this regard, the computer system 1100 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1100 in this embodiment includes a processing system 1102 (e.g., a processor or group of processors), a system memory 1104, and a system bus 1106. The system memory 1104 may include non-volatile memory 1108 and volatile memory 1110. The non-volatile memory 1108 may include read-only memory (ROM), erasable programmable read-only memory (EPROM), electrically erasable programmable read-only memory (EEPROM), and the like. The volatile memory 1110 generally includes random-access memory (RAM) (e.g., dynamic random-access memory (DRAM), such as synchronous DRAM (SDRAM)). A basic input/output system (BIOS) 1112 may be stored in the non-volatile memory 1108 and can include the basic routines that help to transfer information between elements within the computer system 1100.

The system bus 1106 provides an interface for system components including, but not limited to, the system memory 1104 and the processing system 1102. The system bus 1106 may be any of several types of bus structures that may further interconnect to a memory bus (with or without a memory controller), a peripheral bus, and/or a local bus using any of a variety of commercially available bus architectures.

The processing system 1102 represents one or more commercially available or proprietary general-purpose processing devices, such as a microprocessor, central processing unit (CPU), or the like. More particularly, the processing system 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing system 1102 is configured to execute processing logic instructions for performing the operations and steps discussed herein.

In this regard, the various illustrative logical blocks, modules, and circuits described in connection with the embodiments disclosed herein may be implemented or performed with the processing system 1102, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing system 1102 may be a microprocessor, or may be any conventional processor, controller, microcontroller, or state machine. The processing system 1102 may also be implemented as a combination of computing devices (e.g., a combination of a DSP and a microprocessor, a plurality of microprocessors, one or more microprocessors in conjunction with a DSP core, or any other such configuration). In some examples, the processing system 1102 may be an artificially intelligent device and/or be part of an artificial intelligence system.

The computer system 1100 may further include or be coupled to a non-transitory computer-readable storage medium, such as a storage device 1114, which may represent an internal or external hard disk drive (HDD), flash memory, or the like. The storage device 1114 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1116 and any number of program modules 1118 or other applications can be stored in the volatile memory 1110, wherein the program modules 1118 represent a wide array of computer-executable instructions corresponding to programs, applications, functions, and the like that may implement the functionality described herein in whole or in part, such as through instructions 1120 on the processing device 1102. The program modules 1118 may also reside on the storage mechanism provided by the storage device 1114. As such, all or a portion of the functionality described herein may be implemented as a computer program product stored on a transitory or non-transitory computer-usable or computer-readable storage medium, such as the storage device 1114, volatile memory 1108, non-volatile memory 1110, instructions 1120, and the like. The computer program product includes complex programming instructions, such as complex computer-readable program code, to cause the processing device 1102 to carry out the steps necessary to implement the functions described herein.

An operator, such as the user, may also be able to enter one or more configuration commands to the computer system 1100 through a keyboard, a pointing device such as a mouse, or a touch-sensitive surface, such as the display device, via an input device interface 1122 or remotely through a web interface, terminal program, or the like via a communication interface 1124. The communication interface 1124 may be wired or wireless and facilitate communications with any number of devices via a communications network in a direct or indirect fashion. An output device, such as a display device, can be coupled to the system bus 1106 and driven by a video port 1126. Additional inputs and outputs to the computer system 1100 may be provided through the system bus 1106 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for intelligently learning a beam codebook for multi-antenna wireless communications, the method comprising:

obtaining receive power measurements from a plurality of antennas; and training the beam codebook using deep learning and the receive power measurements, wherein the training of the beam codebook is achieved without knowledge of positions of wireless users within an environment accessed by a network node associated with the beam codebook.

2. The method of claim 1, further comprising beamforming wireless communications with a wireless device using the trained beam codebook.

3. The method of claim 2, further comprising initiating the wireless communications with the wireless device using the trained beam codebook.

4. The method of claim 1, wherein the training of the beam codebook uses the deep learning and the receive power measurements only.

5. The method of claim 1, wherein the training of the beam codebook is achieved without employing channel estimation.

6. The method of claim 1, wherein no knowledge of hardware details of communication circuitry that is employed at the network node associated with the beam codebook is used to train the beam codebook.

7. The method of claim 1, wherein the training of the beam codebook is achieved without knowledge of hardware details of communication circuitry that is employed at the network node associated with the beam codebook.

8. A neural network for training of a beam codebook for multi-antenna wireless communications, the neural network comprising:

an actor network configured to predict one or more beam patterns for the beam codebook; and a critic network configured to evaluate the one or more beam patterns predicted by the actor network based on receive power measurements of an environment, wherein the training of the beam codebook is achieved without knowledge of positions of wireless users within an environment accessed by a network node associated with the beam codebook.

9. The neural network of claim 8, wherein the neural network comprises a Wolpertinger architecture.

10. The neural network of claim 8, wherein the training of the beam codebook uses deep learning and the receive power measurements only.

11. The neural network of claim 8, wherein the training of the beam codebook is achieved without employing channel estimation.

12. The neural network of claim 8, wherein the training of the beam codebook is achieved without knowledge of hardware details of communication circuitry that is employed at the network node associated with the beam codebook.

13. The neural network of claim 8, further comprising beamforming wireless communications with a wireless device using the trained beam codebook.

14. A network node, comprising:

communication circuitry coupled to a plurality of antennas and configured to establish communications with a wireless device in an environment; and a processing system configured to:

obtain receive power measurements from the plurality of antennas;

perform a machine learning-based analysis of the environment based on the receive power measurements; and adapt the communications with the wireless device in accordance with the machine learning-based analysis of the environment, wherein training of a beam codebook associated with the network node is achieved without knowledge of positions of wireless users of the wireless device within the environment accessed by the network node.

15. The network node of claim 14, wherein the communication circuitry comprises a radio frequency (RF) transceiver.

16. The network node of claim 15, wherein the RF transceiver is configured to communicate via at least one of a terahertz (THz) band or a millimeter wave (mm Wave) band.

17. The network node of claim 14, wherein the training of the beam codebook uses deep learning and the receive power measurements only.

18. The network node of claim 14, wherein the training of the beam codebook is achieved without employing channel estimation.

19. The network node of claim 14, wherein the training of the beam codebook is achieved without knowledge of hardware details of the communication circuitry that is employed at the network node associated with the beam codebook.

20. The network node of claim 14, wherein the processing system is further configured to:

beamform wireless communications with the wireless device using the trained beam codebook.

* * * * *